Inventors
RICHARD S. POOLE,
DONALD E. MARSHALL,

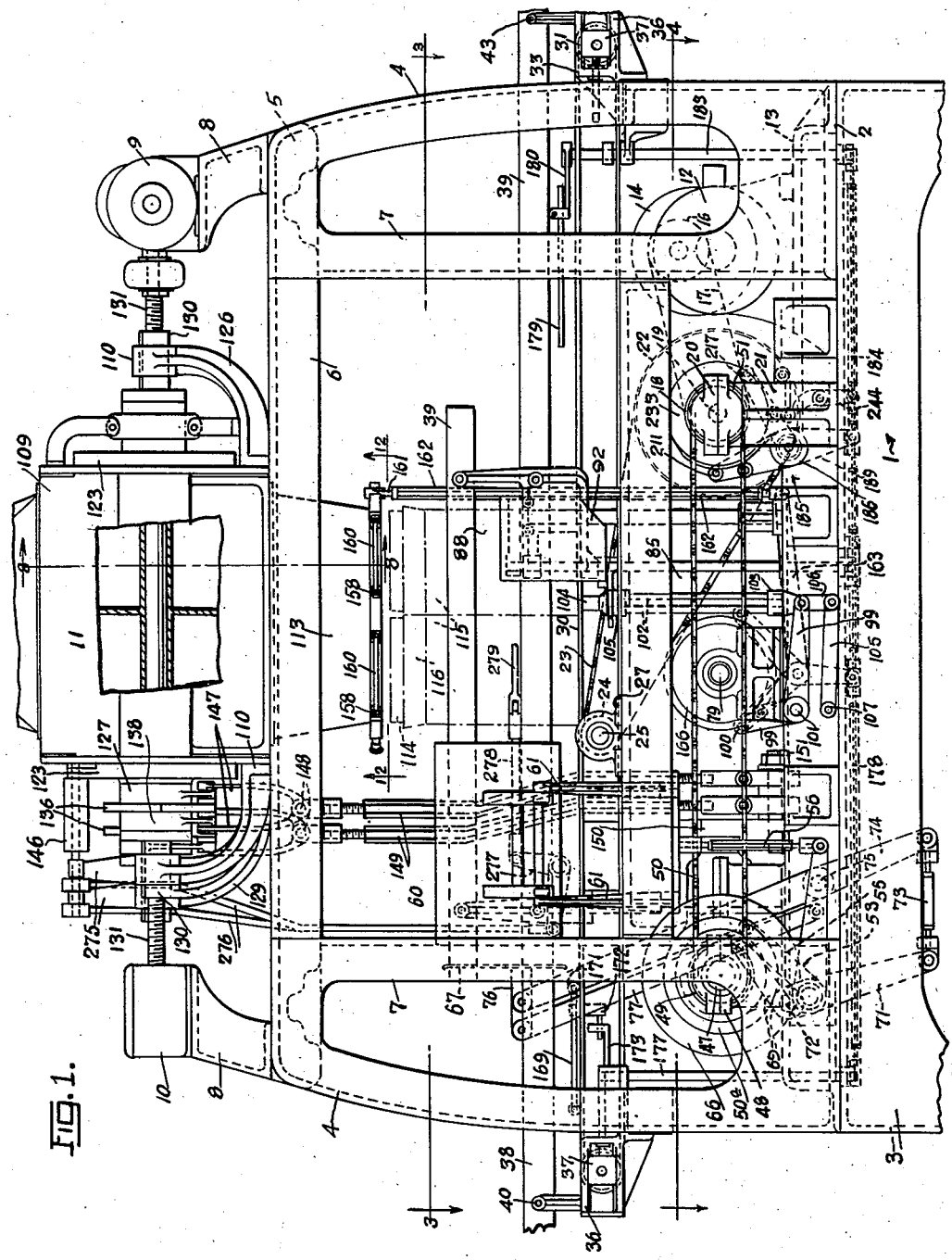

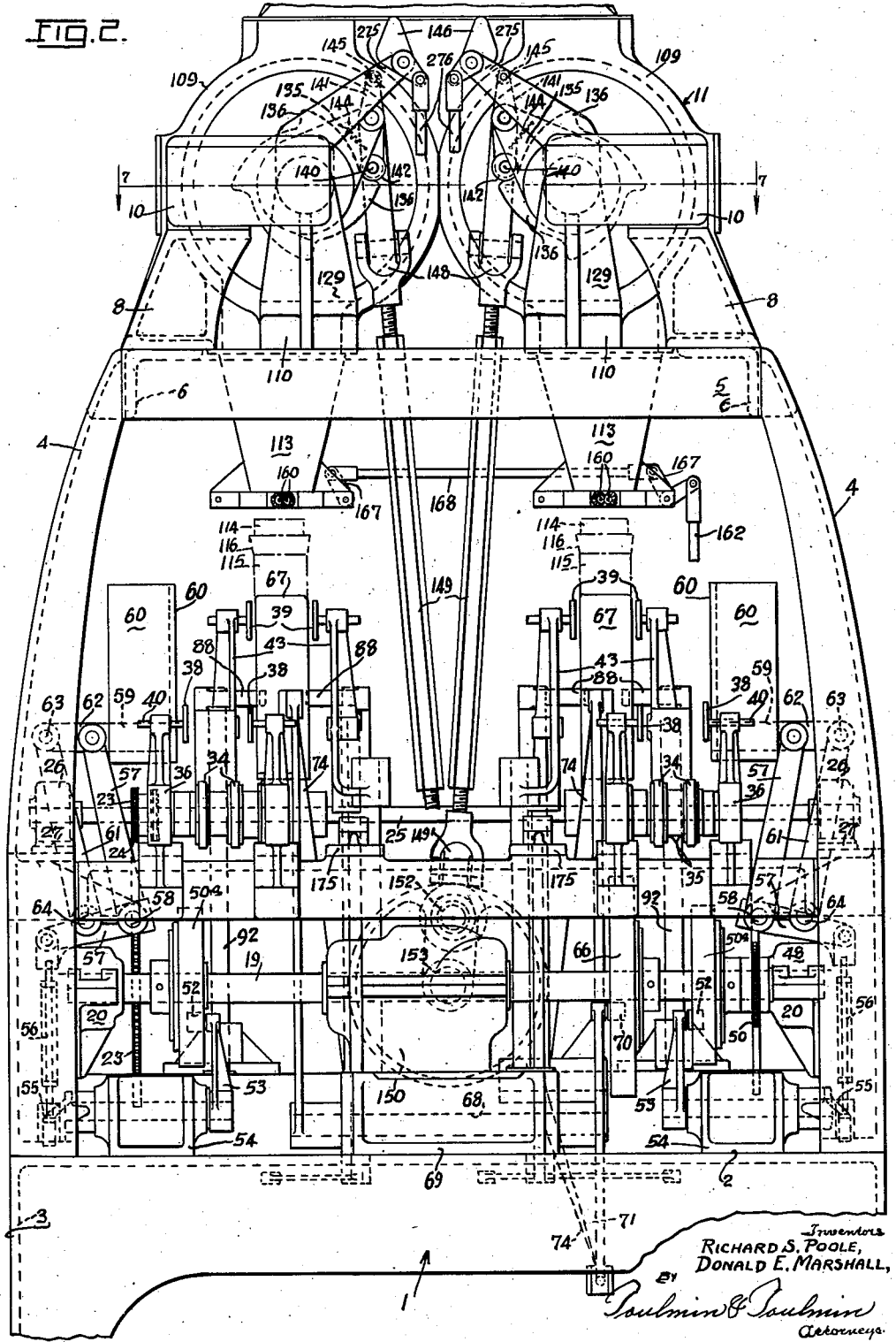

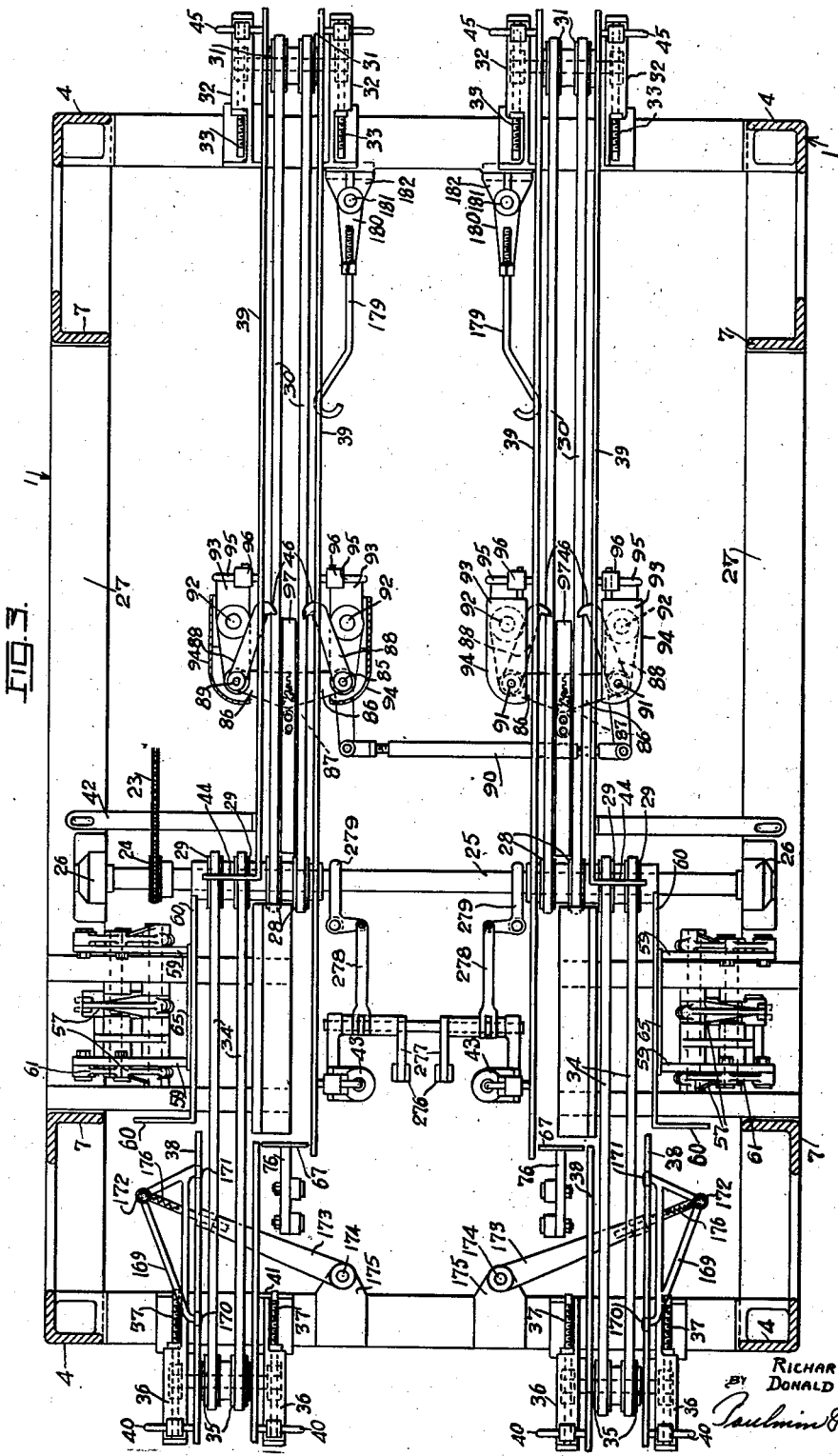

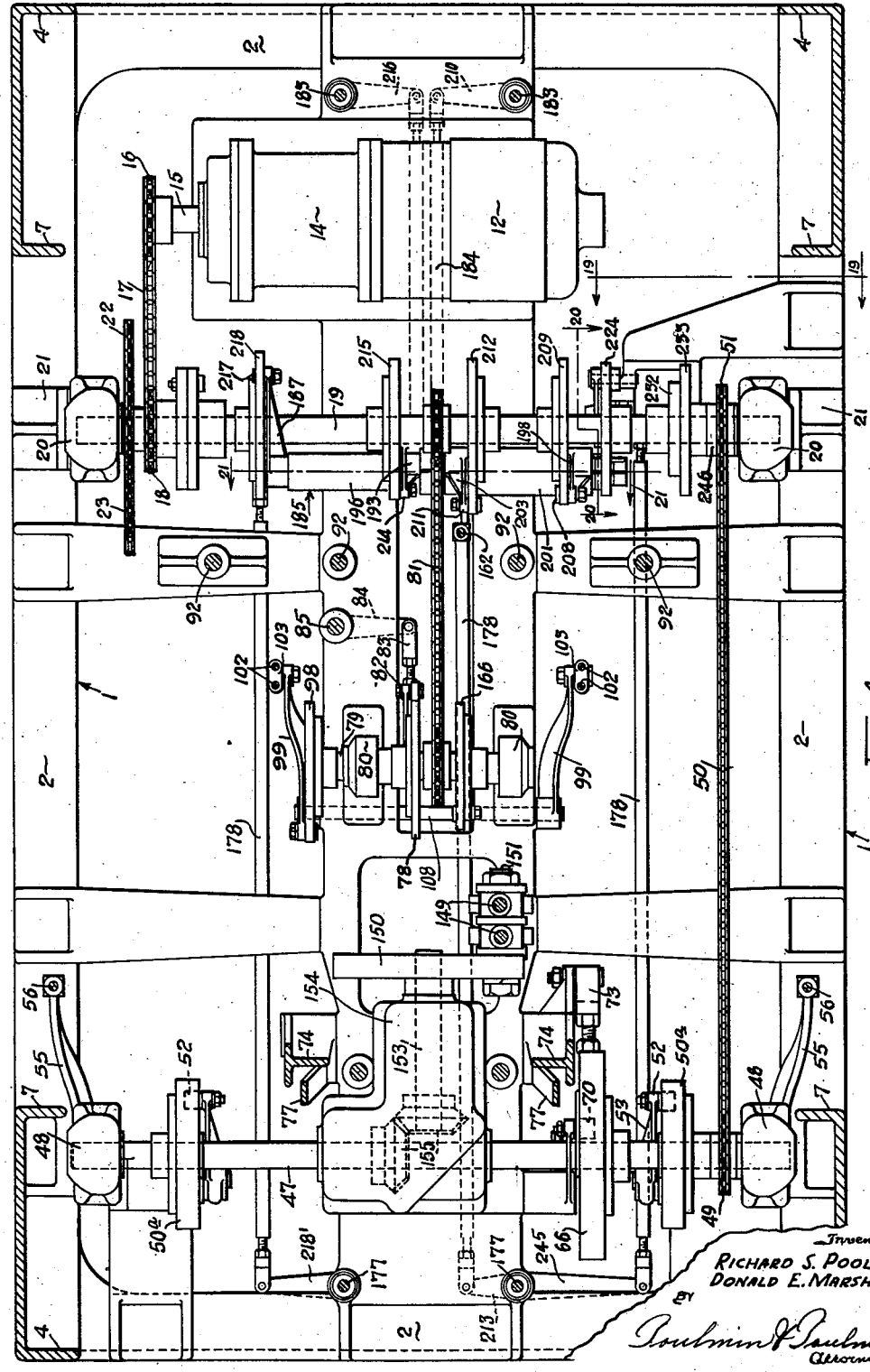

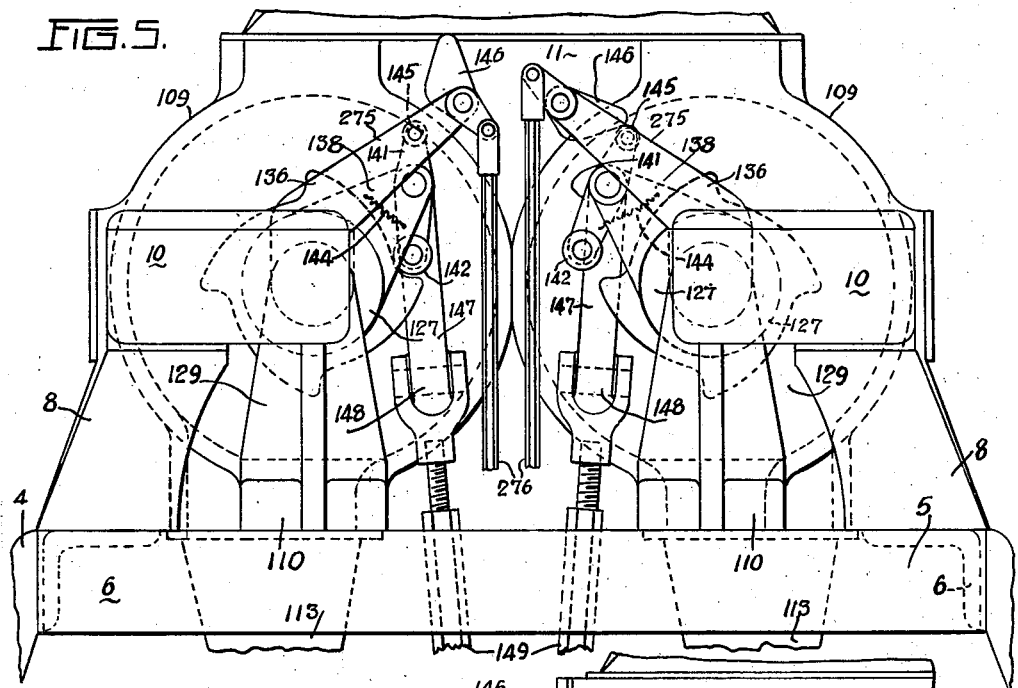
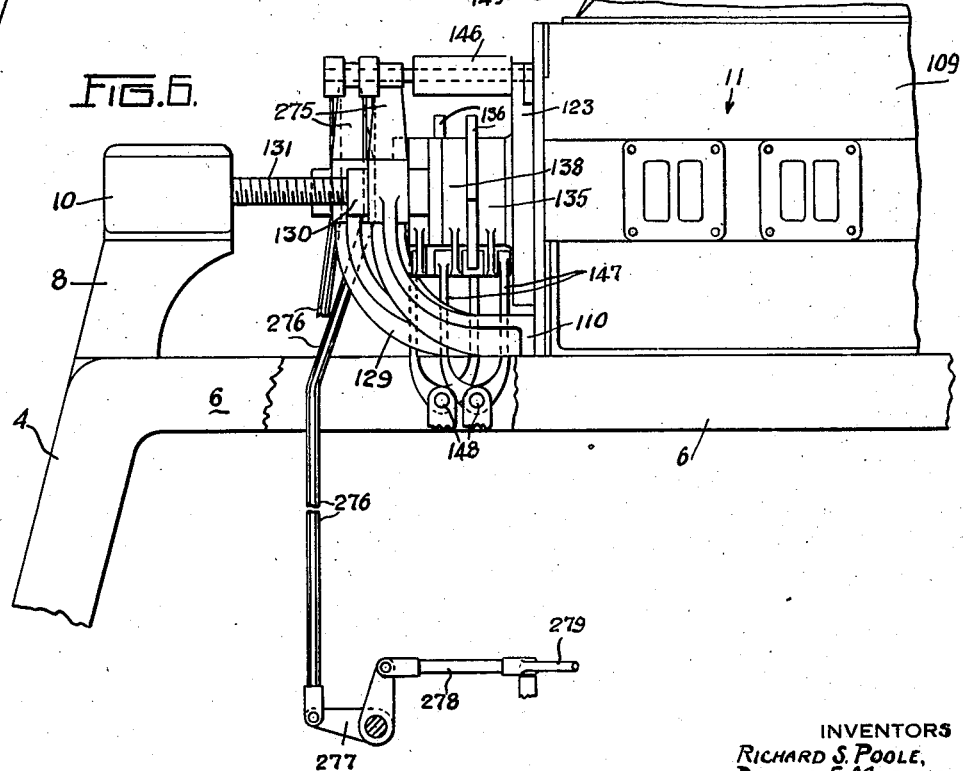

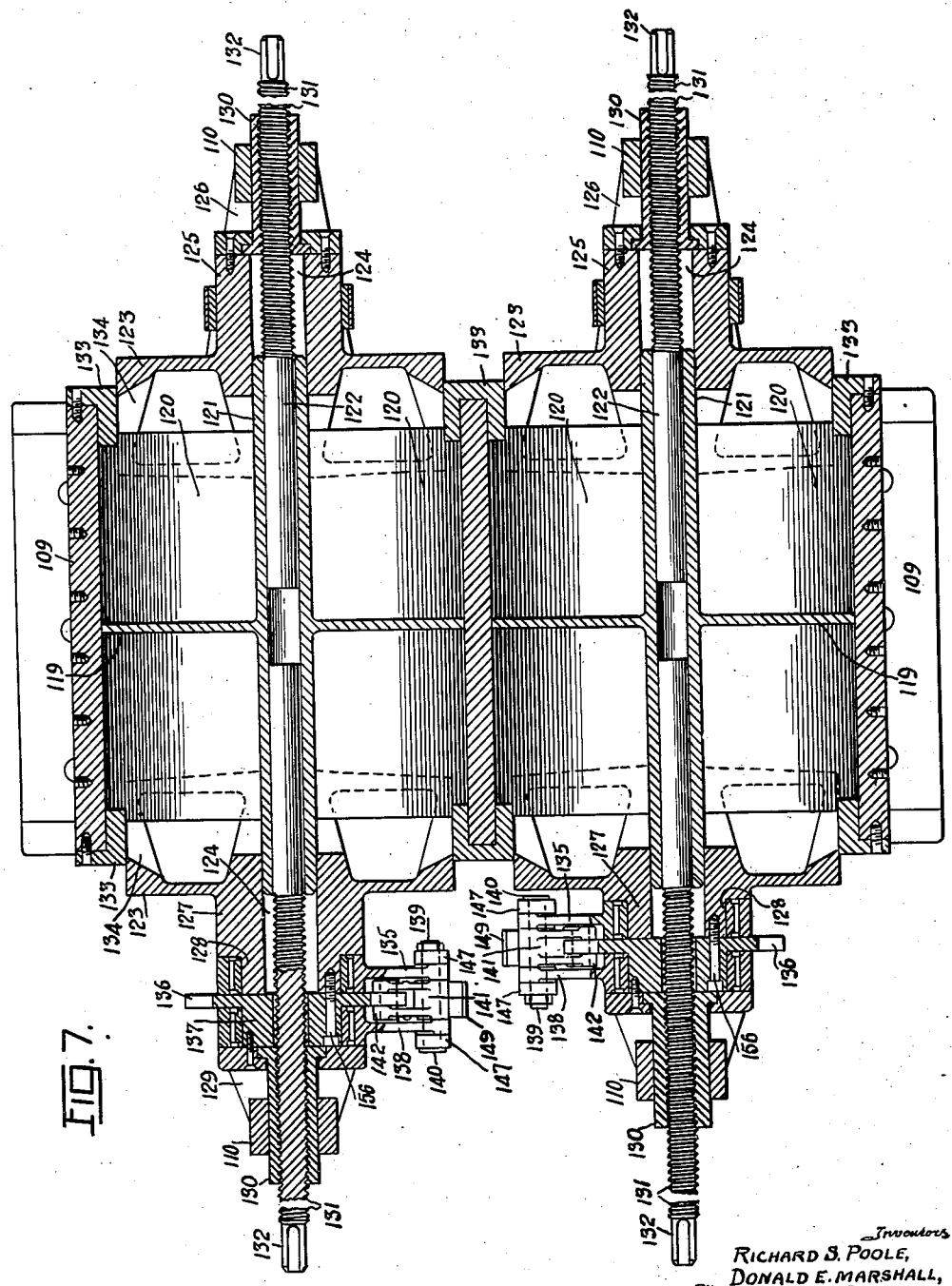

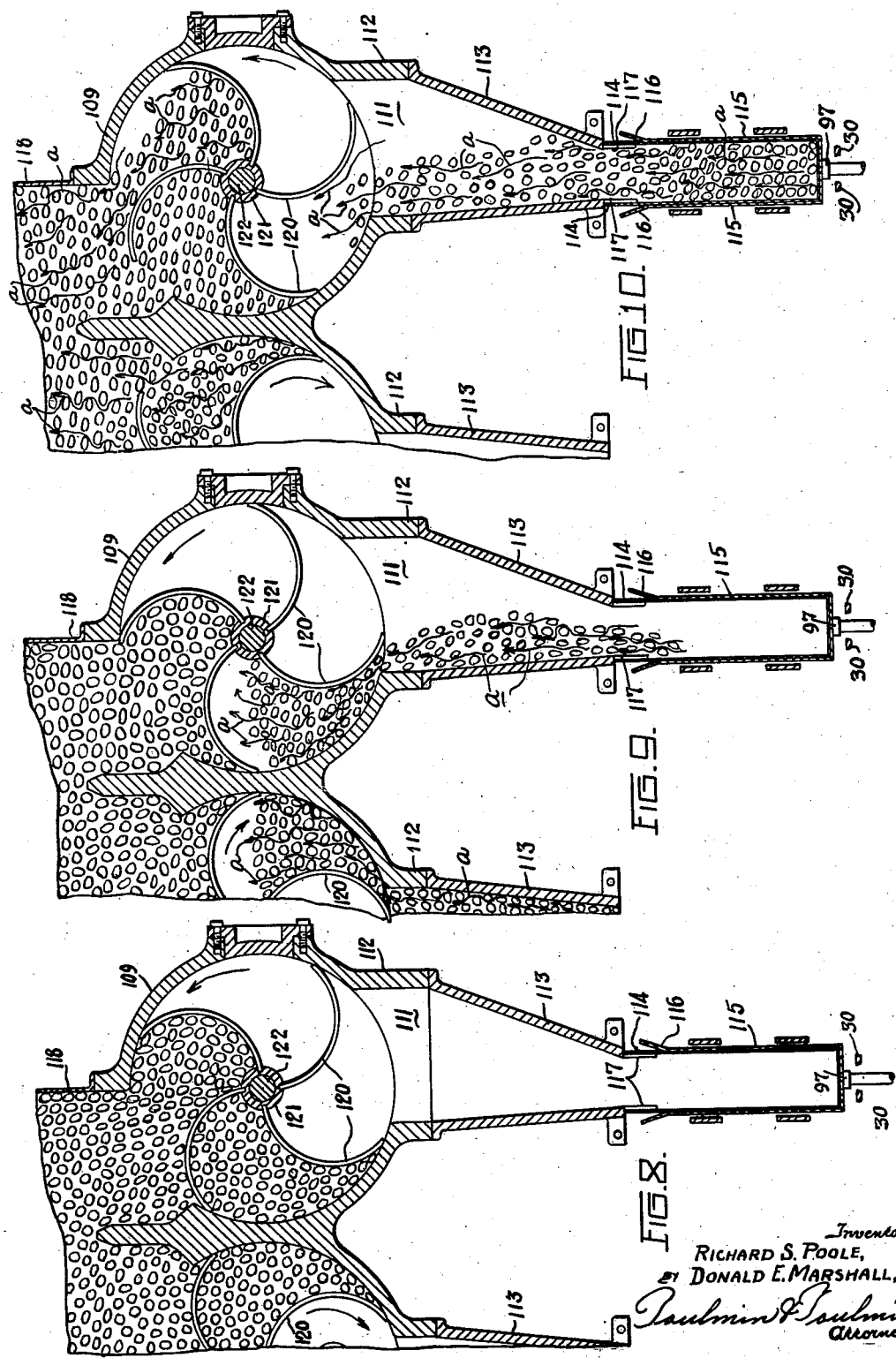

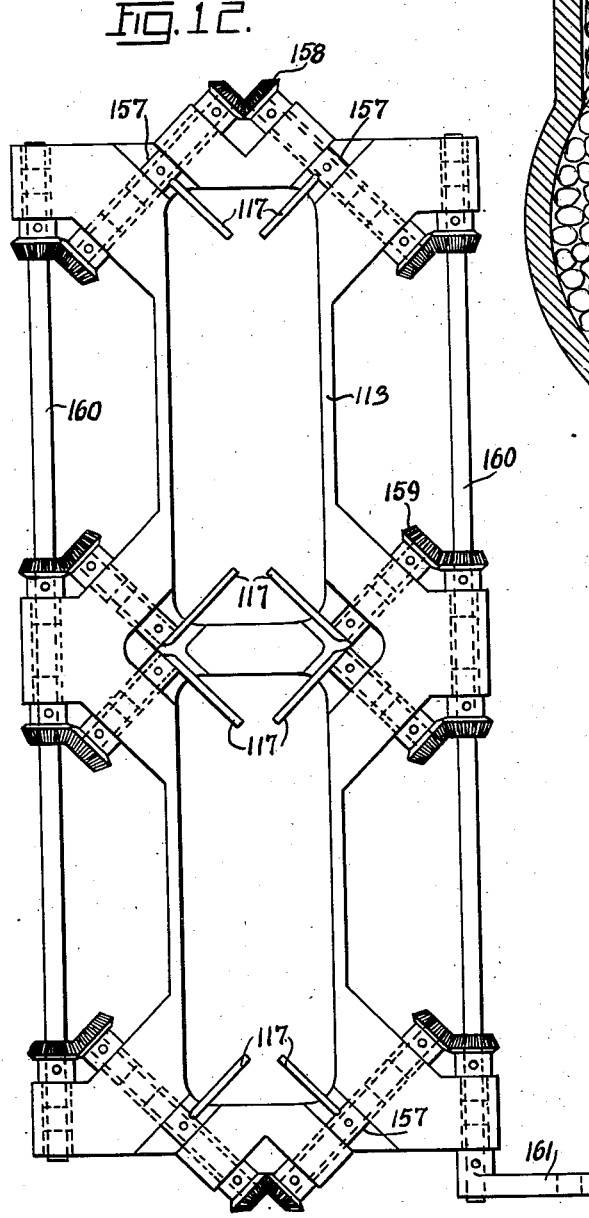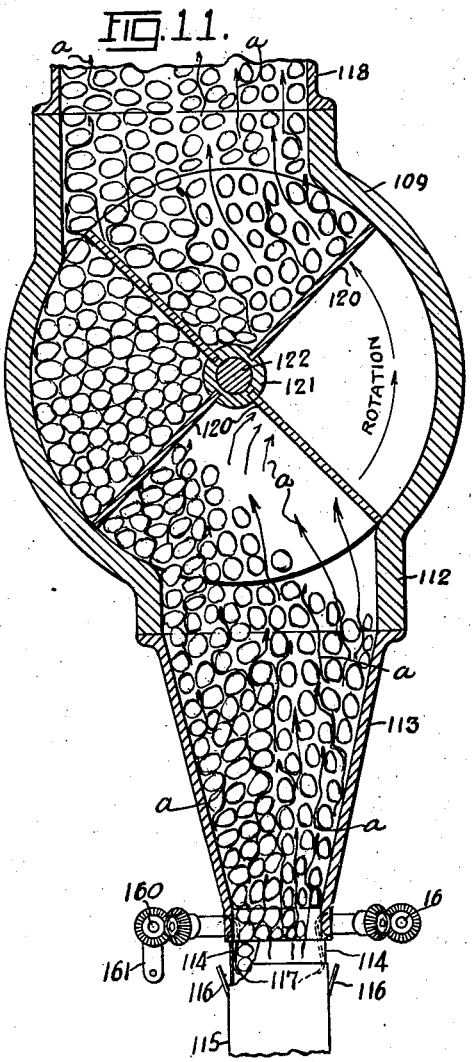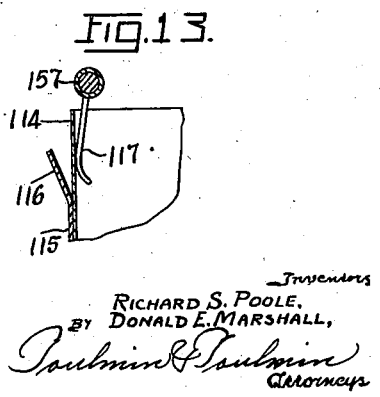

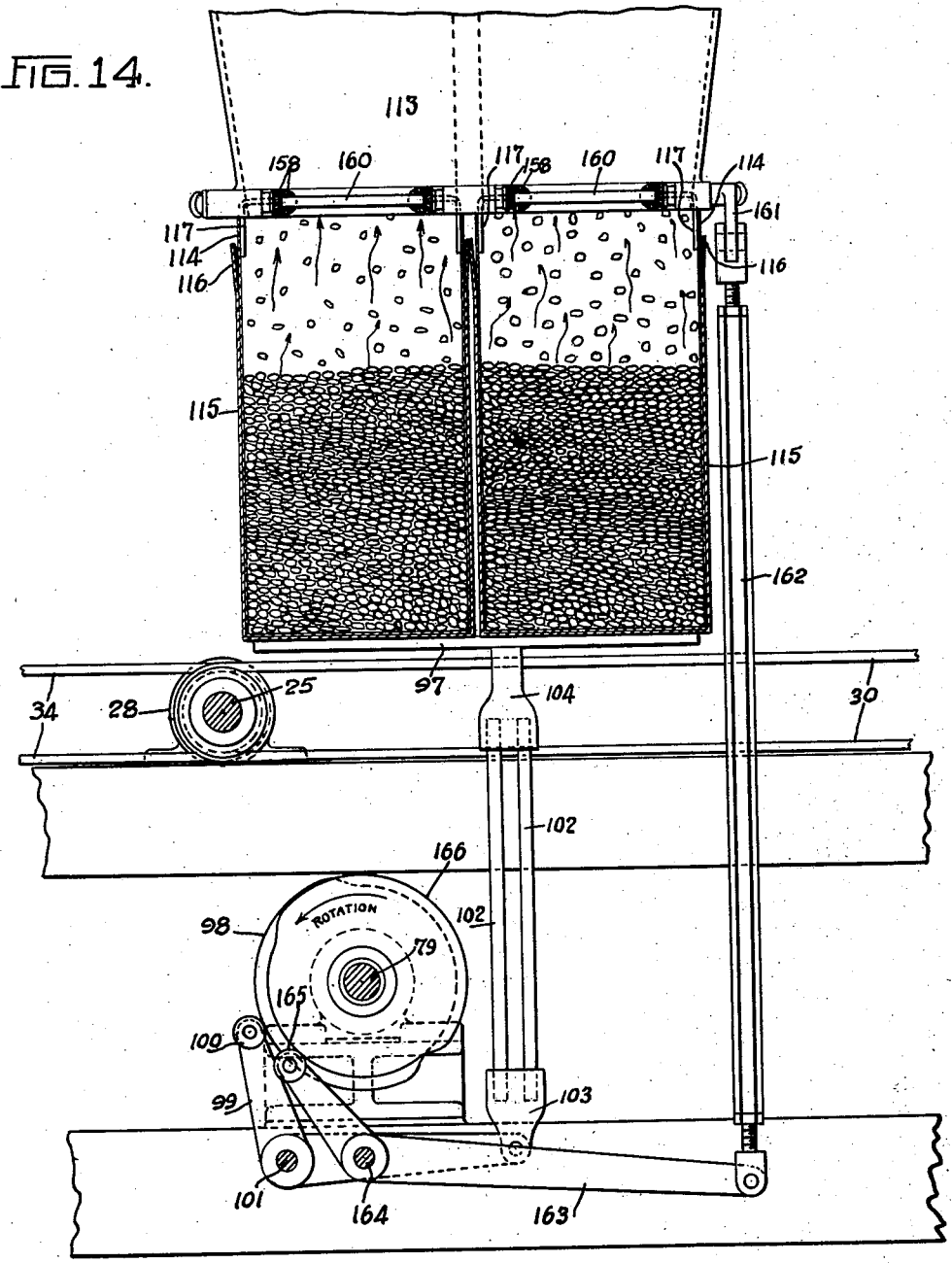

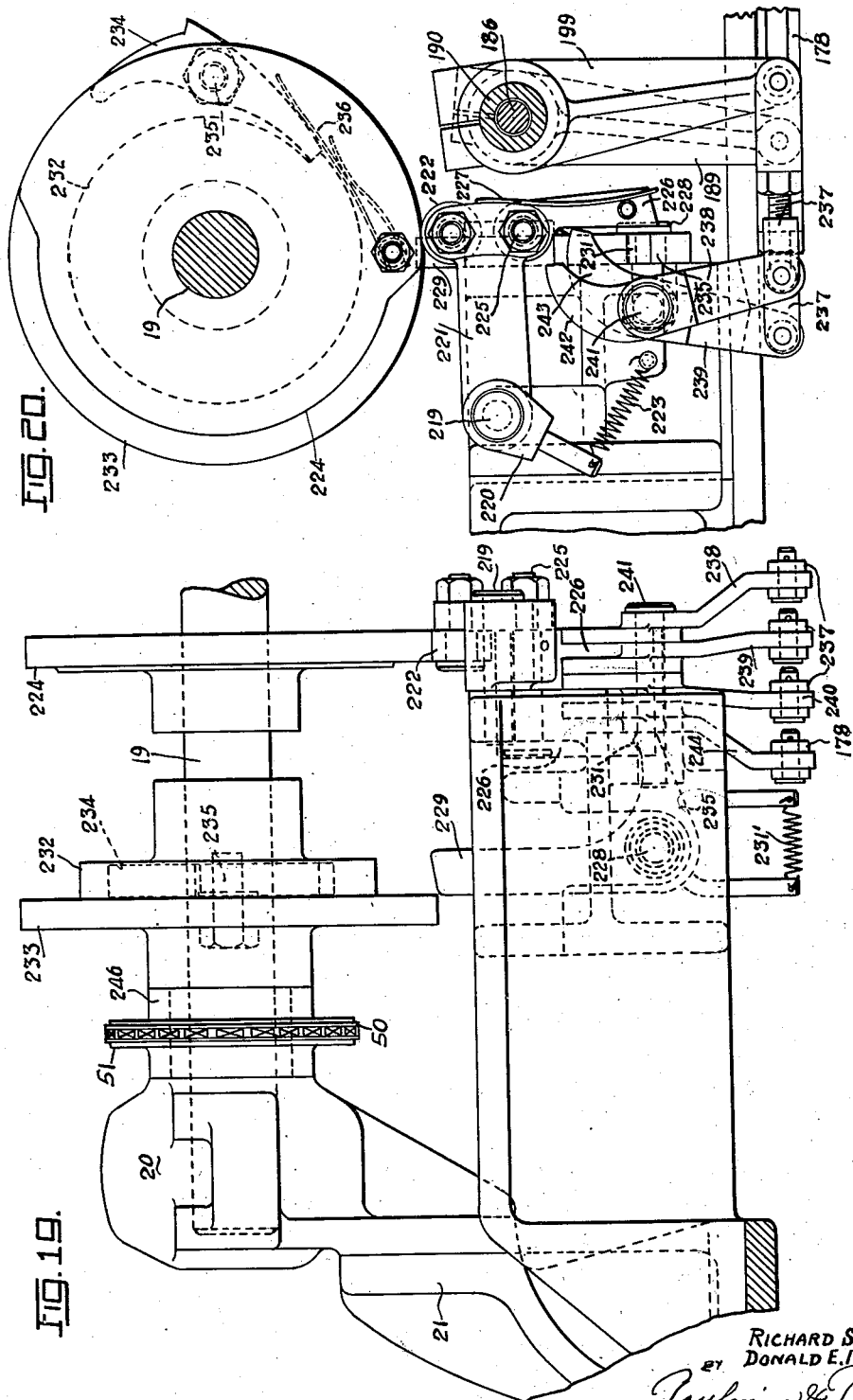

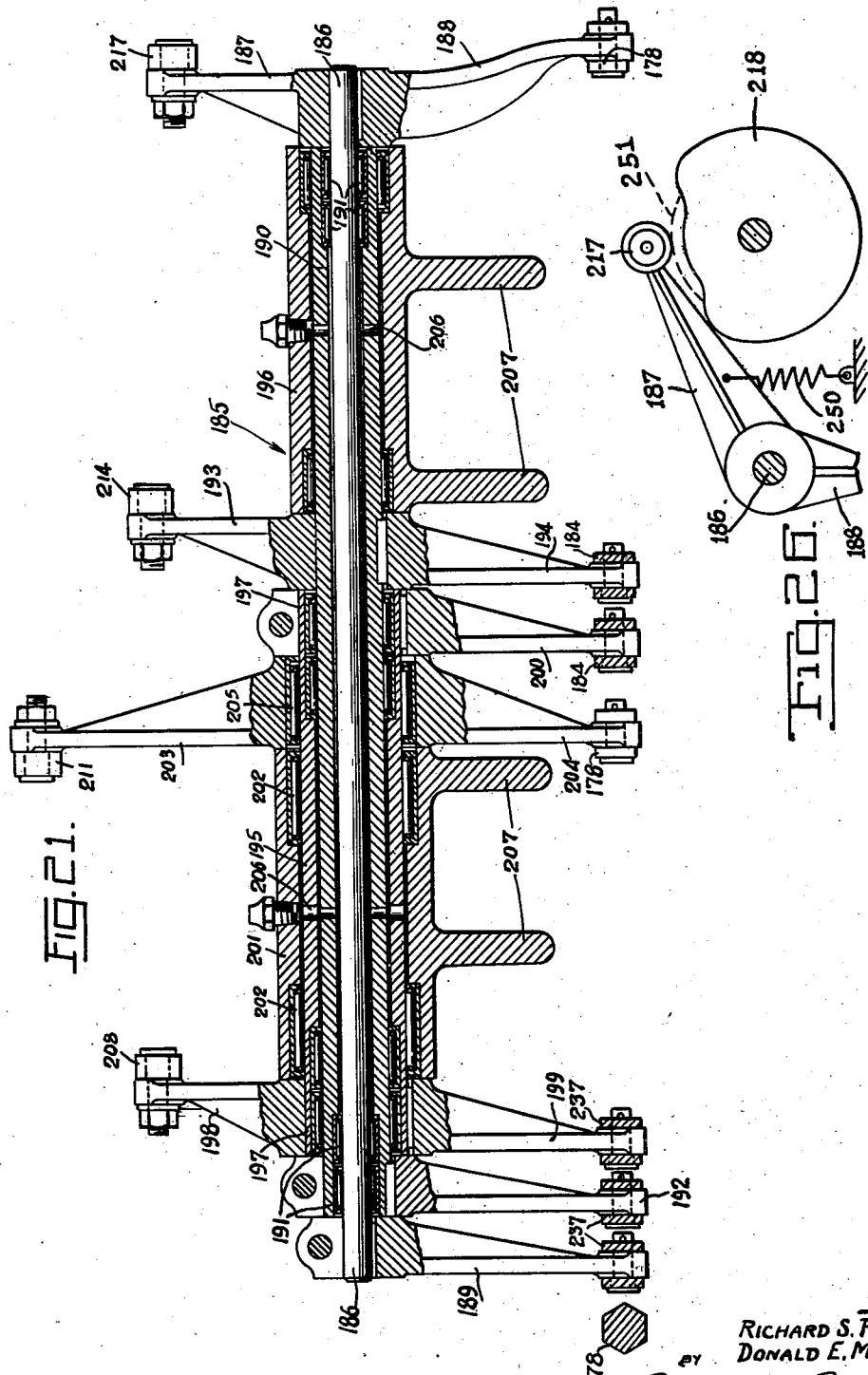

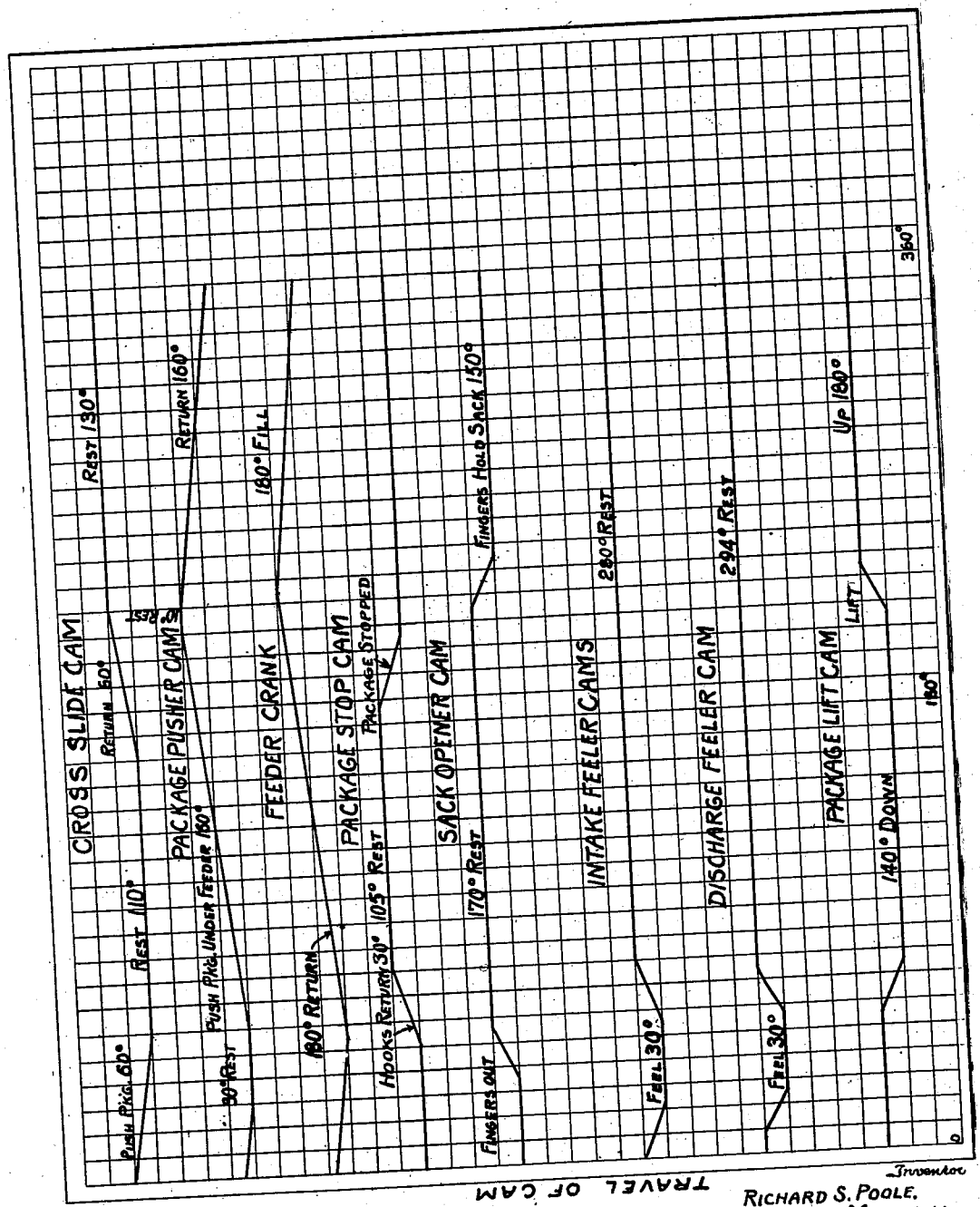

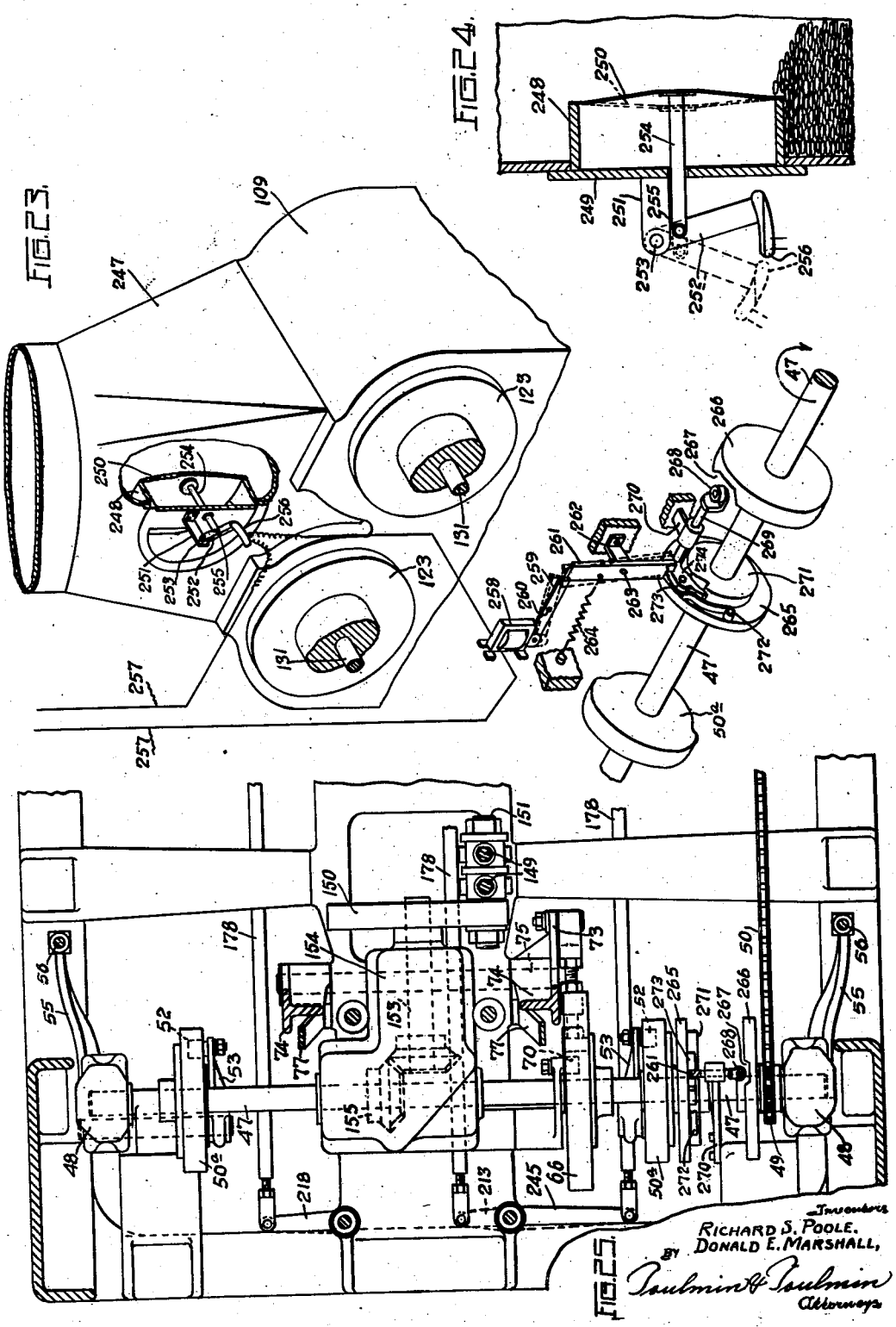

Patented July 29, 1941

2,250,603

UNITED STATES PATENT OFFICE 2,250,603

CARTON-FILLING MACHINE

Richard S. Poole and Donald E. Marshall, Battle Creek, Mich., assignors to Kellogg Company, Battle Creek, Mich., a corporation of Delaware Application March 10, 1939, Serial No. 260,934

29 Claims. (Cl. 226—99)

The present invention relates to machines for filling cartons with a fluent material such as cereal, sugar, salt, etc. In particular, the improved machine serves to fill a liner or sack contained in a carton with toasted corn flakes.

In the past, it has been customary to present the cartons to a filling hopper in a single line and conveyed in any suitable manner, for example, by hooks. When the carton reached a position just below the hopper, the hooks were released and the carton was elevated by suitable mechanism to a position such that the contents of the hopper would drop by gravity into the carton or its contained liner. Mechanism was employed at this stage to spread the mouth of the liner so as to facilitate the filling operation. After the carton was filled with cereal, the elevating mechanism was retracted and the filled carton was conveyed by a hook and traveling belt arrangement to the next machine in line, usually a "top sealer," so-called.

This prior art machine employed certain protective devices which operated when abnormal conditions arose. For example, a machine was provided with a so-called "feeler" which "felt" for the absence of cartons, denoting that no cartons were being fed to the hopper. Again, this prior machine was also provided with a feeler in the discharge line, i. e., on the opposite side of the spout from the other feeler, to feel or detect the presence of cartons which would denote a "piling up" condition. These feelers were connected through suitable mechanism which operated to stop practically the entire machine. The stoppage of the machine by either feeler entailed loss of considerable energy as well as involving considerable inertia which prevented sudden stops.

While the machine of the type described gives satisfactory performance, it is open to certain fundamental objections. The main objection is the slowness with which the cartons are filled, since it is necessary to present each carbon individually to the spout of the filling hopper. The mechanism by which the carton was presented to the position just below the hopper was also somewhat complicated in that it involved a double hook arrangement which clamped about each carton and conducted the latter along a platform until the hopper was reached. Again, it was noticed that spaces might occur between the upper edge of the carton and the lower surface of the hopper or spout which might occasion spillage due to the speed and force with which the cereal travels downwardly into the carton, thus causing the cereal to find a ready egress through any space which presents itself.

The objections set forth above are obviated by the improved machine which forms the subject of the present invention which also includes other additional features.

Accordingly, the primary object of the invention is to provide an improved carton-filling machine which is capable of filling cartons at a much faster rate than the prior art machines. This object is attained, in brief, by providing two lines of carton travel and presenting not less than two cartons in each line to a multi-spout hopper. In the device as illustrated and which will be described hereinafter, a so-called "dual" filling machine, two cartons in line and two abreast, making four cartons, are presented simultaneously to a quadruple spout hopper.

Another object of the invention is to eliminate the slightest possibility of spillage while the carton is in the filling position. In brief, this object is attained by improving the carton-elevating mechanism including the adjustment thereof by which the carton or rather the upper edge of its contained liner is made actually to abut, even to the extent of forming a temporary hermetic seal with the lower surface of the spout. Thus, there is no space left through which cereal might find egress.

A still further object is to improve the protective mechanism by which the feelers, both in the intake and discharge line serve to stop certain fundamental operations of the machine when they detect an abnormal condition. In brief, the improvement consists of limiting the mechanism which is operated by the respective feelers to only that which performs fundamental feeding operations, but permitting the continued operation of other mechanism which performs only incidental functions. Thus, the energy expended and the inertia involved are considerably less when operated by the improved mechanism responsive to either or both feelers.

Another object of the invention is to provide mechanism by which the size of the hopper and, therefore, the height to which the cartons are filled with cereal may be manually controlled. In the past, it had been customary to control the size of the charge in the hopper automatically by the weight of a preceding filled carton.

Still another object is to provide a manual control by which one or both sides of the dual machine can be stopped for emergency reasons and in case only one side is stopped, the other side is permitted to operate.

Another feature of the improved machine is a provision by which certain fundamental operations of the machine are automatically stopped, but not all of the operations, when there is a scarcity of cereal or other material in the hopper.

Another object of the invention is to provide an improved form of hook for controlling the position of the carton with respect to the hopper or spout. The improved hook takes a form of a stop rather than a clamp, as in the prior machine.

Another object is to improve the manner in which the cartons are presented to the hopper. Whereas, in the prior machine, the cartons were conveyed to the elevating plate by means of a hook clamp, it is proposed to move the cartons to this position by means of a travelling belt and to stop the cartons after having reached this position by an improved stop or hook member referred to in the immediately foregoing paragraph.

Another object of the invention is to reduce the time during which the cartons are being filled and removed from the filling spout. It will be understood that, when a single line of cartons is presented to the spout, the filling operation is interrupted during the time that it takes the next carton to arrive at the filling position. Even when the cartons move in an abutting relation so that as little time as possible is lost in this connection, the time in the aggregate of the "non-filling" portion of the operating cycle may still be considerable. Obviously, this "non-filling" time is even greater when spacing is allowed between cartons, as is the usual practice. This object is attained in brief by presenting the cartons in groups of at least two in abutting and abreast relation to the discharge openings of the hopper so that the time taken by the filling operation is proportionately decreased, thus permitting fresh cartons to be brought up into filling position more rapidly. From the practical standpoint, it is desirable to present the cartons in groups of four or more, i. e., two in line or tandem and two abreast, thereby still further reducing the "non-filling" portion of the operating cycle.

Another object is to provide a supply compartment leading to one or more spouts, and in which the problem of segregation of the fine particles which tend to accumulate along the sloping walls is eliminated. The usual "bridging" of material is also avoided and consequently no hopper agitators are required with their collateral breakage effects. This object is attained in brief by providing two or more rotating hoppers in tandem and abreast, across the compartment, making at least four in all, so arranged that the common inlet opening to the hoppers extends over the entire compartment and the latter can have substantially straight sides, or at least sides which diverge. Thus, no opportunity is presented for the material to "bridge" the compartment, nor for the fine portion therof to accumulate at the sides of the compartment.

Another object is to provide a feed compartment having a rotating hopper and in which the vanes are so arranged and have such a shape as to relieve the congestion of the material at the point where the compartment is filled with material. This object is attained in brief by employing vanes of an arcuate configuration and rotating the vanes in the same direction as that in which the tips of the blades are curved. It has been found that vanes of this character tend to minimize breakage of the fragile material.

The final object of the invention is to improve the mechanism by which the mouth of the liner is spread while in filling position. In brief, this improvement consists in providing fingers which are of arcuate configuration rather than straight, which has been found to reduce the tendency to tear the liner.

Other objects and features will be apparent as the specification is perused in connection with the accompanying drawings, in which—

Figure 1 is an elevational view of the front of the improved machine.

Figure 2 is an end elevation of the machine, looking toward the right from the lefthand end of Figure 1.

Figure 3 is a sectional view, partly in plan, taken along the line 3—3 in Figure 1.

Figure 4 is a sectional view, also partly in plan, taken along the line 4—4 in Figure 1.

Figure 5 is a partial end elevation of the feed protective system, and

Figure 6 is a fragmentary front elevation of the same mechanism.

Figure 7 is a horizontal section taken along line 7—7 in Figure 2, and showing details of the dual hopper.

Figure 8 is a vertical cross section of the dual hopper and taken along the line 8—8 in Figure 1.

Figures 9 and 10 are views similar to Figure 8, but showing different positions of the quadrantal feeder.

Figure 11 is a cross section of a modified form of quadrantal feeder in that it shows vanes of straight, rather than curved configuration.

Figure 12 is a bottom plan view, looking upwardly under the spout along line 12—12 in Figure 1.

Figure 13 is a cross sectional view (not indicated on any other figure) of the improved finger for spreading the mouth of a liner.

Figure 14 is a front view of the spout, and carton-elevating and finger-moving mechanism, taken from a position as in Figure 1, but all other mechanism removed for the sake of clearness. The cartons and liners are shown in cross section so that the cereal filling can be observed.

Figure 19 is an elevational fragmentary view, looking in the direction of the arrows along line 19—19 of Figure 4. This view shows the declutching mechanism and the manner of operation by the intake and discharge feelers which detect abnormal conditions in the operation of the machine.

Figure 20 is a view taken along line 20—20 of Figure 4 and shows the side view of the mechanism illustrated in Figure 19.

Figure 21 is a view, partly in elevation, but mainly in section, taken along line 21—21 in Figure 4. This view shows the so-called "feeler cam shaft," by which movement is transmitted from the feelers and their operating cams to the declutching mechanism shown in Figures 19 and 20.

Figure 22 is a graph indicating the relative motions and time of travel of the various cams and cranks employed in the operation of the improved machine.

Figure 23 is a perspective view of the upper portion of the dual hopper provided with a protective device in the inlet for stopping certain operations of the machine when there is no cereal or other food in the hopper.

Figure 24 is a partly sectional and partly elevational view of the detector portion of the protective device shown in Figure 23.

Figure 25 is a view of a modified form of machine which is provided with an additional declutching mechanism operable by the "no food" detector shown in Figures 23 and 24. This view is similar to the lefthand portion of Figure 4, i. e., taken along line 4—4 in Figure 1, except for the additional declutching mechanism.

Figure 26 is a diagrammatic fragmentary view showing the spring action on the intake feeler cam and follower to permit the feeler to oscillate through a wider angle than usual when abnormal conditions are detected in the incoming carton feeder lines.

Figure 15:
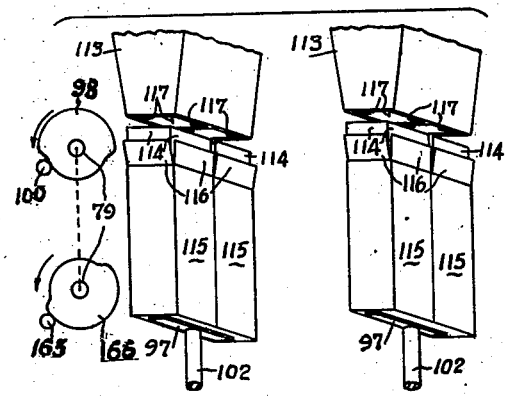
Figure 15 shows diagrammatically the relative positions of a pair of cartons and their spouts, also the relative positions of the finger-moving and carton-elevating cams.

*General description of the improved machine and its operation*

In general, the improved machine comprises mechanism for automatically moving two parallel lines of cartons into positions, from which a pair from each line is moved transversely as a unit so that the two pairs (i. e., one pair from each line) reach parallel adjacent positions. The group of four cartons is then pushed on to a traveling belt which moves a group to a position beneath a hopper having four spouts, i. e., two in a line and two abreast. Each pair of cartons in line is brought to rest at this position, i. e., caused to slide on the belt, by a hook or stop which grips the first carton of the pair, thus also stopping the second carton which follows it.

The group is then elevated as a unit into filling position and the hopper is simultaneously charged with cereal or other fluid material. A finger mechanism is employed to spread the mouth of each carton, by pulling out each corner while the carton is being elevated and during the filling operation.

Manual adjustments are also provided for controlling the amount of cereal alloted to each carton. The elevating mechanism is preferably so adjusted that a sufficiently tight joint to constitute a hermetic seal between each carton and its spout is obtained in order that the feeding mechanism in the hopper can be used to evacuate the air from the carton, as well as for keeping the spout filled with cereal. This air evacuation feature facilitates the filling operation by removing the air cushion at the bottom of the carton, and the tight joint prevents spillage between the carton and the spout.

As the cartons are filled, the two pairs are lowered as a unit on to a traveling belt and the stops removed, which permits the cartons to be conveyed to the next machine such as a "top sealer."

Protective systems, some manually operated, others automatic, are provided to stop certain parts of the machine, particularly the mechanism which moves the cartons transversely, also the mechanism which pushes the cartons on to the belt which delivers them to the hopper, and the mechanism which controls the feeding hopper when abnormal conditions arise in either line of carton travel. These conditions may comprise the failure of the empty carton supply, or the "piling up" of filled cartons or the scarcity of cereal in the hopper.

Having summed up the general operation of the machine, a detailed description will now be given and, in the interests of clearness, the different operations and the structure by which they are accomplished will be described separately.

The parts which will be described hereinafter are all carried on a frame provided with a number of supports on platforms secured at different levels for carrying the actuating motor, the various cam shafts, the conveying belt mechanism and the hopper.

Referring more particularly to Figures 1 to 4 inclusive, this frame is constituted of a base member 1 of rectangular configuration, provided with a platform 2 over those surfaces which carry the mechanism and strengthened about its perimeter with a web 3. As can be seen in Figures 3 and 4, the platform 2 extends only over very limited portions of the base. Upstanding from the platform, at each end thereof, there is a pair of leg members 4 of arcuate configuration, these members being joined together at the top by an angle iron 5 to constitute an end frame of closed perimeter. These end frames are tied together by an angle iron 6 which extends the length of the machine on each side thereof and intermediate their ends, near the end frames, there is a vertically extending strengthening beam 7. At each corner where the beams 5 and 6 come together (Figures 1, 2), there is mounted a pedestal 8, a pair of which, at one end of the machine, supports two motors 9, of which only one is shown in Figure 1. The pedestals at the other end carry a pair of switches 10, as seen more clearly in Figure 2. The purpose of these motors and switches will appear hereinafter. The top frame members 6 provide a support for a dual hopper of the quadrantal type and designated generally at 11, the details of which will also be explained hereinafter.

The operating mechanism of the machine is actuated for the most part by the main motor 12 which is carried on a base 13 and supported from platform 2, as seen more clearly in Figure 1. There is a box 14 containing reduction gears (Figure 4), and this box carries a shaft 15 and a sprocket indicated at 16. The sprocket drives a chain 17 which transmits power through a sprocket indicated at 18 (Figure 4) secured to a shaft 19. As can be seen more clearly in Figures 2 and 4, this shaft extends across the entire width of the machine and is journaled at each end in bearings 20, supported from the platform 2 by the upstanding journal boxes 21. This shaft carries a number of cams and a declutching mechanism, all of which will be referred to hereinafter. There is also a large sprocket indicated at 22 (Figures 1, 4), mounted on the shaft 19, and this sprocket carries a chain 23 which passes over a sprocket 24 mounted on a shaft 25.

*Conveyor belt mechanism*

The shaft 25 extends the full width of the machine and is journaled at each end in a bearing 26 supported from a platform 27 which is secured to the frame between the side uprights 7. The shaft 25 carries two inner positioned pairs of pulleys 28 and two outer positioned pairs of pulleys 29. Two pairs of fairly narrow belts 30 are passed around the pulleys 28 and these belts are lined up with two pairs of pulleys 31 located at the righthand end of the machine, as seen in Figures 1 and 3. The pulleys 31 are supported on hangers 32, and provision is made, as indicated at 33, for moving the pulleys 31 with respect to the frame and, therefore, tightening the belts 30.

Similarly, the two outer pairs of pulleys 29 carry belts 34 which line up with pulleys 35 journaled in the hangers 36 at the opposite end of the machine from the pulleys 31. A belt-tightening arrangement 37 is provided for the belts 34.

These belts will be referred to hereinafter as conveyors and the purpose of the belts 34 is to convey two lines of empty cartons to a position such that the cartons are moved transversely and longitudinally of the belt on to the belts 30 which forward the cartons, first, to a filling position and later, convey the filled cartons away from the machine on to the next machine (not shown). The cartons, as they move along the several conveyors, pass between groups of guide plates, two pairs of which are indicated at 38 at the lefthand end (Figure 3) or intake part of the machine and another pair indicated at 39 at the opposite or discharge end of the machine. The guide plates 38 may be supported from the frame in any suitable manner and, as illustrated, they are supported at one end by rods 40 from the hangers 36 and at the other end supported by a bar 41. Likewise, the lefthand ends of the outer guides 39 are supported from the frame by the bars 42 and corresponding ends of the inner guides 39 are supported by the hangers 43. It will be noted (Figure 3) that the lefthand ends of the outer guides 39 terminate in a portion 44, bent at right angles to the direction of the guides. The purpose of this portion will appear presently. The righthand ends of the guides 39 are supported by the rods 45 which are, in turn, secured to the hangers 32.

Empty cartons are placed, either automatically or manually, on the belts 34 which convey them as far as the stop 44. The cartons are then moved inwardly until they line up with the belts 30 and as determined by the inner guide members 39, after which the cartons are given a longitudinal push on to the belts 30. After traveling along the belts 30, the cartons are brought to a stop by a hook or stop arrangement indicated generally at 46, during which the cartons are elevated in pairs to a filling position, i. e., actually abutting a hopper which will be described hereinafter. Upon being filled, the boxes are lowered again on to the belts 30 and the hooks 46 are released to permit the filled cartons to travel to the next machine.

The mechanism by which the empty cartons are given their transverse and longitudinal movements, also the mechanism for stopping the cartons on the belts 30 and for elevating the cartons to filling position will be treated under the separate headings of "Carton cross slide mechanism," "Carton pusher mechanism," "Stop hook operating mechanism," and "Carton elevating mechanism."

*Carton cross slide mechanism*

In addition to the cam shaft 19, the machine is provided with a second cam shaft 47 which is journaled in the bearings 48 and is driven by a sprocket 49 which receives power from a chain 50 and a sprocket 51 carried on the shaft 19. The shaft 47 carries at each end a so-called cross slide cam 50a which actuates through the roller 52 and its connected lever 53, a shaft which passes through a bearing 54, as seen more clearly at the bottom of Figure 2. This shaft actuates a crank indicated at 55 which reciprocates a connecting rod 56 in a vertical direction. This rod is connected at its upper end to a bell crank lever having arms 57 and pivoted at 58. The upper end of the upper arm 57 is pivoted in a bar 59 which is secured to an upstanding flat plate 60. It is apparent that, as the connecting rod 56 is moved upwardly, the upper end of the upper bar 57 is moved inwardly and carries the plate 60 toward the middle of the machine. In order that the bar 59 shall have a truly horizontal movement, a pair of extra levers 61, 62 is provided and pivoted together at 63. The levers 62 may comprise an extension of the bar 59, and the lower end of the lever 61 is pivoted to the frame of the machine at 64.

It will be understood that there are two plates 60 provided and two separate cams and two independently operating mechanisms. In view of the fact that the plate 60 must accommodate the width of not less than two cartons, it is usually quite long and for that reason may be provided with a transversely extending reinforcing bar 65. In order to transmit the transverse movement equally to both ends of the plate and its bar, the levers 57, 59, 61, 62 and 63 may be provided as duplicate members and secured to the bar 65 in proper position, as indicated in Figure 3. The design of the cross slide cams 50a and the timing of their operation will be discussed hereinafter when reference is made to the graph shown in Figure 22.

*Carton pusher mechanism*

As pointed out hereinbefore, this mechanism is for the purpose of pushing the empty cartons on to the belts 30 after they have been given a transverse movement by the cross slide plates 60. The cam 66 for operating the pusher plate 67 is carried on the shaft 47. Unlike the cross slide cam arrangement, only one cam for both pushers is provided. This cam operates one of the pusher plates directly and its motion is transmitted to the other pusher through a jack shaft 68 (Fig. 2) journaled in the bearing 69. The cam is shown more clearly in Figures 2 and 4, and the roller 70 is secured to a bell crank lever 71 which is pivoted at 72. The lower end of this lever is connected through a rod 73 to a long lever 74 which is pivoted at 75 and carries at its upper end a bar 76. This bar is connected to the pusher plate 67. Thus, as the cam 66 rotates, the bell crank lever 71 swings about its pivot 72, causing the lever 74 to rotate about its pivot 75 and to give a horizontal movement to the bar 76. In order to assure the bar 76 moving in a strictly horizontal direction, an additional lever 77 is provided, this lever being pivoted to an extension of the bar 76 and pivoted at the opposite end to the frame of the machine.

It is apparent that the jack shaft 68 is carried on the axis of the pivot 75 so that, as the lever 74 is given an arcuate movement, the corresponding lever at the other side of the machine is given a similar operation. The pusher plates 67 are, therefore, moved in unison in the direction of the longitudinal axis of the machine, and the time sequence of this movement depends on the design of the cam 66 which will be discussed in connection with the graph shown in Figure 22.

The stop hook operating mechanism

It was pointed out hereinbefore that the hooks 46 are for the purpose of temporarily stopping the travel of the empty cartons on the belts 30 at a position immediately below the filling hopper. As will be seen in Figure 3, one set of hooks is employed for each respective pair of belts 30. The hook mechanism is operated from a cam 78 which is secured to a jack shaft 79 carried in the bearings 80 and rotated through a sprocket and chain arrangement 81 from the main shaft 19. The roller for the cam is indicated at 82 and is connected through a rod 83 to a crank 84 which is keyed to a shaft 85. This shaft extends upwardly and terminates at a position just below one of the inner guides 39. Keyed to the shaft at its upper end, there is a bell crank lever, one arm 86 of which constitutes a segmental member provided with teeth 87 over its arcuate periphery. The other arm 88 takes on a hook configuration. On the other side of the belts 30 from the rod 85, there is a stud shaft 89 which carries a bell crank lever having arms similar to the arms 86 and 88, respectively. The teeth of the arms 86 are arranged to mesh with one another.

It is apparent that, as the rod 85 is rotated by the operation of the cam 78, say, for example, in counterclockwise direction, as seen in Figure 3, the lower hook arm 88 will move inwardly, and this corresponding motion is carried to the opposite hook arm through the segmental gear 87. The motion of the two inwardly moving hook arms is carried through a linkage system, indicated generally at 90, to a stud shaft 91 of the opposite group of hooks and the rotation of the shaft causes the hook portion 88 of its bell crank lever to move inwardly and to carry a corresponding movement to its associated hook through the segmental gear which constitutes the other arm of the bell crank lever. Thus the operation of the cam 78 causes the hook arms 88 to move either inwardly, at which position they engage the front edge of a carton, or to retract these arms to release the carton.

It is, of course, desirable to adjust the horizontal position of these hooks in order to accommodate the different heights of cartons and in order to present themselves directly to the cartons without interference from the guide rails 39. For this purpose, each half of the hook unit is adapted to slide on a vertically extending rod 92 (of which there are four provided per machine), which may be mounted from the frame of the machine in any suitable manner. The rods 92 pass through openings in the flat bars 93, and the latter may be adjustably secured in any suitable manner to the rods in order to determine the height of the hook member 88. After the proper height has been determined, the bar is rigidly secured to the rod 92. Guard members 94 may be provided, made of sheet metal and having a configuration such as to cover the hook arms. Intermediate support for the guide rails 39 may be provided through the rods 95 which are carried in the sleeves 96 secured to the bars 93.

The design of the cam 78, by which the hooks 86 are caused to move inwardly and then retracted at the proper moment will be discussed in connection with the graph shown in Figure 22.

Carton elevating mechanism

For elevating the cartons into filling position so that the top edge of the contained liner just abuts the lower surface of the hopper, an elevating plate 97 is provided, as seen more clearly in Figure 3. This plate is positioned between two adjacent belts 30 so as to avoid these belts when being elevated, and is of such length as to accommodate at least two cartons. The cam 98 for elevating the plates 97 is carried on the shaft 79. A bell crank lever 99 (Figure 1) carries a roller 100 which is pressed in any suitable and well known manner against the cam, this lever being pivoted at 101. The opposite end of the lever, from the roller, is pivotally secured to a pair of connecting rods 102 secured together at each end by caps 103. The upper cap is secured to the elevating plate 97 through a rod 104. Thus, as the cam 98 is rotated through the shaft 79 and the chain belt 81, the connecting rods are caused to move vertically upwardly to give the plate 97 a vertical reciprocatory motion. In order to assure that the rods 102 will move in a perfect vertical direction, the additional levers 105 and 106 may be provided, the former of which is pivoted at 107 to the frame of the machine and the latter may constitute an extension of the connecting rods and is pivoted to the lever 105.

Inasmuch as only one cam is provided for operating the elevating plates of both sides of the machine, the rotating movement of the bell crank lever 99 is carried through a jack shaft 108 to mechanism corresponding to levers 99, 105, 106 and the connecting rods 102 to their respective elevating plate. The cam design and the sequence of operation initiated thereby will be discussed in connection with the graph shown in Figure 22.

Hopper feeding mechanism

The dual hopper 11 referred to hereinbefore is constituted of a pair of cylindrical drums 109 which are mounted on pedestals 110 secured to the angle irons 6 which run across the top of the machine. Each drum has a centrally disposed aperture 111 at the bottom thereof, as seen more especially in Figures 8 to 10 inclusive, which serves as a discharge opening for the cereal. The aperture communicates through a downwardly extending cylinder 112 with a funnel or spout member 113. The dimensions of the spout at its lowermost portion and the configuration thereof are preferably similar to the dimensions and configuration of the liner 114 contained within the carton 115 (Figures 8 to 10).

It will be understood that the carton is usually made of cardboard and reaches the filling machine with the bottom of the carton sealed, but the flaps 116 at the top left open. In case it is desired to package a food such as corn flakes which must be kept dry in order to retain their crispness, it is usual to provide the carton with an interior sack or liner 114 made of waxed paper. This liner, with its mouth in open position, usually extends considerably higher than the height of the open flaps. As pointed out hereinbefore, the elevations of the plate 97 are so adjusted that the liner 114 actually abuts the lower surface of the spout 113, thus forming a seal therebetween which is so tight as to be practically hermetic. In order to maintain the mouth of the liner open while cereal is being discharged through the opening 111, a plurality of fingers 117 is employed, which extend diagonally outward from each corner of the spout opening. The mechanism for operating these fingers in a structural arrangement will be described under a separate heading.

The two drums 109 are arranged side by side and communicate with the same inlet 118, there being provided a relatively short partition which extends upwardly from the bottom of the drums in order to separate the operation of the individual feeding mechanism. The drums 109 are provided with a transversely extending partition 119 in the middle of each drum, as seen more clearly in Figure 7. There is a separate discharge opening 111 for each side of the drums 109, making four openings in all, to which four spouts 113 are secured. Thus, the hopper comprises two compartments in line and two compartments abreast so as to fill simultaneously four cartons. The quadruple form of hopper lends itself to high speed filling of the cartons, since it accommodates a large number of cartons at one time.

It is apparent that, since the cartons must be presented to the hopper intermittently and not as a continuous operation, some provision must be made to deliver the cereal to the spouts 113 as successive charges synchronously with the elevation of the cartons into the filling position. For this purpose, there is provided a four-bladed impeller 120, each blade or vane of which preferably takes an arcuate configuration such as is shown in Figures 8 to 10 inclusive. However, if desired, these blades may take the form of a plain flat surface, as shown in Figure 11. These blades are secured at their inner edges in any suitable manner to the partition 119. The impeller is adapted to rotate, preferably in the counterclockwise direction, as seen in Figures 8 to 10, and for this reason, the blades are mounted on a long collar or hollow shaft 121 which is adapted to rotate on the shaft or shafts 122. However, for reasons which will be apparent in connection with the adjustment of the size of the hopper, the shafts 121, 122 are prevented from moving longitudinally with respect to one another. The curved form of blade has been found to cause the minimum breakage of flakes, particularly when rotated in the direction indicated. The shaft 121 is secured to the partition 119 so that the impellers in the two juxtaposed hoppers are rotated simultaneously. The ends of the shaft 121 are journaled in end-bearing members 123 (Figure 7), which have openings 124 adapted to receive the ends of the shaft and to permit the latter to slide therein.

The righthand end bearing member 123, as seen in Figure 7, is provided with a hub 125 which is secured through a ribbed member 126 to the pedestal 110 referred to hereinbefore. The lefthand end bearing member 123 is likewise provided with a hub 127 which has an undercut 128. The undercut portion of the hub 127 provides part of the bearing for the mechanism which is employed to index or intermittently rotate the impeller. The hub 127 is mechanically connected to the pedestal 110 through a ribbed plate 129 and the mechanism by which the impellers are given an intermittent rotating motion. The plates 126 and 129 carry bushings 130 which are interiorly threaded to receive a screw 131 terminating at one end in a nut 132 and extending at the other end for a short distance within the shaft 122.

The end bearing member has an exterior diameter such as slidably to fit within a peripheral flange 133 provided at the ends of each drum 109. The inner plane surfaces of the members 123 extend beyond the outer edges of the blades 120. These surfaces are provided with grooves 134 of the same configuration as the blades 120 so as slidably to receive the latter. The general arrangement is such that, as screw 131 is turned, its corresponding end bearing member 123 is caused to slide along the shaft 121 and also along the inner surface of the flange 133. This movement, in effect, reduces the distance between the partition 119 and the inner surface of the member 123, thereby simultaneously changing the volume or content of the spaces which are bounded between adjacent blades 120 and the drum 109. Instead of providing separate screws 131 for the juxtaposed hoppers, thus necessitating independent adjustment, it may be feasible to run the screw 131 through an enlarged bore which extends along the length of the shaft. If each end of the screw 131 is threaded in the proper direction with respect to the threads of their respective bushings, an adjustment at one end of the screw will serve to move both end bearings either inwardly or outwardly, depending on the rotation of the screw. This has been indicated at the broken-away portion in the upper part of Figure 1.

It is apparent, therefore, that by simply rotating the nuts 132, it is possible either to increase or decrease the size of the charges provided by the impeller and delivered to the spout 113. While the screws 131 can be adjusted manually, it is preferred to employ motors for this purpose. In Figure 1, a single motor 9 is indicated, having this function and this motor is representative of any number of motors or even a single motor with proper gearing required to operate two or more screws 131. These motors are controlled by a switch, of which one unit is indicated at 10 (Figure 1), which determines the direction of rotation and the speed of the motor or motors. The switches are operated manually, as determined by the operator's judgment as to whether a greater or less quantity of cereal, compared with a predetermined quantity is being delivered by the impellers to each carton.

Impeller rotating mechanism

It was pointed out hereinbefore that the impellers 120 were rotated preferably counterclockwise, as seen in Figures 8 to 10, and in an intermittent manner. For this purpose, an indexing mechanism is provided, the cross section of which is shown more clearly in Figure 7 and the elevational views in Figures 2 and 5. The undercut portion of the hub 127 slidably receives a crank 135. There is rotatably mounted on the screw 131 and positioned adjacent the crank 135, a ratchet wheel 136 which is provided with four ears in case there are four impeller blades. The ratchet wheel 136 is provided with a hub extension 137, on which is rotatably mounted a crank 138 similar to crank 135. These cranks are bolted together, as indicated at 139, by a shaft 140. Pivotally mounted on the shaft, there is a pawl 141 (Figures 2, 5), terminating at its lower end in a large roller 142 which is urged against one of the ears of the ratchet by a spring 144 and adapted to engage therewith. The other end of the pawl also terminates in a roller 145, but is of smaller diameter than the lower roller and is adapted to engage a dog 146 constituting a part of a manually operated protective system which will be described in detail hereinafter.

There is a connecting rod 147 having bifurcated end portions (as seen in Figure 1) pivotally mounted on an extension of the shaft 146.

The bifurcated portions 147 are connected through a swivel joint 148 to a connecting rod 149 which is given a reciprocatory vertical motion by a crank disk. In view of the dual character of the hopper, there are two connecting rods provided, but both are operated from the same crank disk. This disk is designated by the reference character 150, as seen more clearly in Figures 2 and 4. These rods are connected, first, through a swivel joint 149' and then through a pitman to a shaft 151 (Figure 4), which carries a stud 152 adapted to engage the periphery of the disk 150. The latter is mounted on a jack shaft 153, journaled in the bearing member 154 and receiving its rotary motion through a pair of miter gears 155 from the shaft 47. Thus, as the disk is rotated, the rods 149 are given a vertical reciprocatory movement which rotates the cranks 135 and 138 on their respective bearings, giving the pawl 141 an arcuate motion which, when it is in its downward position, is caused to engage the ratchet 136 by the spring 144 and to turn the ratchet 90 degrees. The ratchet wheel is fixedly secured to the hub 127 by the screw 156. The latter forms part of the end-bearing member 123 and thus any rotation of the ratchet wheel is transmitted through the hub and end-bearing members to the impeller blades. This indexing motion is carried into the next compartment through the shaft 121, to which all of the blades are secured.

It is apparent that, as the four impellers are intermittently rotated within their respective drums, an exhaust fan action is set up which tends to evacuate the interior of each carton, as the air is being displaced by the falling cereal. This condition is diagrammatically illustrated in Figures 8, 9 and 10 which show successive positions of the impeller and the sequence of the filling and evacuating operations. It is assumed, of course, that the liner 114 provides a substantially air-tight seal with the spout 113. It has been further assumed, in Figure 8, that the contents of the lowermost compartment have already been emptied in a carton which has preceded the one shown. As the next compartment comes into filling position, as indicated in Figure 9, air from the carton ascends through the interstices between the flakes and enters the same compartment, from which the cereals are leaving. This upward movement of the air is indicated by the arrowed lines labeled $a$ in Figures 9 and 10. The amount of entering air and the rate of entry thereof into the second compartment depends not only on the volume of air which is being displaced by the falling cereal in the carton, but also by the amount of space being evacuated by the flakes leaving the compartment.

It has been found that, notwithstanding the fact that the air moves in the opposite direction from the falling flakes, there is little or no interference between the respective movements. The advantage of abstracting the air from the carton is to prevent air cushioning effects in the carton which would tend to slow up the downward movement of the fluffy flakes as they enter the confines of the carton. The seal between the liner and the spout also assures absolutely no spillage at this point.

While it has been pointed out that the impeller 126 is preferably rotated counterclockwise, it would be understood that, if desired, this member can be rotated clockwise and an appreciable amount of evacuation will still be obtained.

It is apparent that there must be a predetermined time relation between the indexing of the impellers and a package elevating mechanism, for otherwise the liner may not have reached its uppermost position early enough to receive the charge delivered by the impeller. The cam design and its time relation with respect to the other cams will be discussed in connection with the graph shown in Figure 22.

*Finger operating mechanism*

It was pointed out that it is desirable to spread the mouth of the liner while the carton is being filled. For this purpose, the fingers 117 referred to hereinbefore are provided. As shown more clearly in Figure 13, the fingers are considerably bent at the end so that, when approaching the mouth-spreading position, the ends thereof will not tear the liner or bag. The fingers extend diagonally and inwardly from each corner of the spout 113, as seen in Figure 12. They extend into the shafts 157 which are suitably journaled at the underside of the spouts. The two end shafts carry a bevel gear 158 at each end and the intermediate shafts carry a bevel gear 159 only at one end. The shafts 157 are so positioned diagonally that the pair of bevel gears at each end of the arrangement meshes with one another, but their opposite gears and the gears of the intermediate shafts mesh with bevel gears secured to side shafts 160.

It is apparent that, if one of the shafts 160 were given a rocking motion, this motion would be transmitted throughout the entire bevel gear and shaft organization to cause the fingers 117 to move from their horizontal position downwardly to a vertical position. In this last position, these fingers would engage the interior surface of the liner 114 and would spread the mouth of the latter to a rectangular configuration corresponding to the size and configuration of the opening in the spout. The shaft 160 is rocked as described above through a lever 161, a connecting rod 162 swiveled at one end and pivotally connected at the other end to a bell crank lever 163, as shown more clearly in Figure 14. This lever is pivoted at 164 and carries at the end opposite from the connecting rod a roller 165. The roller bears against the periphery of a cam 166 which is carried on the shaft 79 (Figure 4). In view of the fact that there are two double spouts abreast and only one cam 166 to operate all of the fingers, it is necessary to transmit the reciprocatory motion of one set of fingers to the other set. This is conveniently done by providing the shaft 160 in the case of both spouts with cranks 167 and tying these cranks together by a connecting rod 168 (Figure 2). Thus, the operation of cam 166 gives the vertical connecting rod 162 a reciprocatory movement which rocks the shafts 160 of its immediately associated finger-moving mechanism, and this rocking motion is carried over to the finger mechanism of the double spout in the abreast position.

Figure 16:
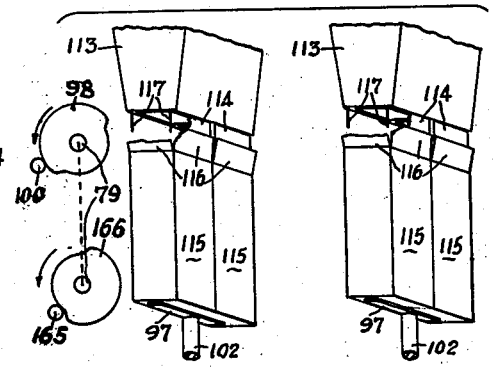
Figure 16 is a view similar to Figure 15, except showing different positions of the cams and, therefore, different positions of the cartons and of the mouth-spreading fingers.

The relative contours and positions of the carton-elevating cam 98 and the finger-moving cam 166, also the relative positions of the cartons and the fingers are clearly shown in Figure 14 and have been developed as a sequential movement in Figures 15 to 18 inclusive. In Figure 14, it will be noted that the cartons are in their highest elevated position and the fingers have moved to their downward vertical position, during which the mouth of the liner is spread wide open to receive the cereal, as indicated in this figure. Figure 15 shows a pair of cartons abreast in their lowermost position with the fingers in their upper horizontal position. The relative positions of the cams for this condition are also indicated. Figure 16 shows the same two cartons after having been elevated and the fingers after having been moved to their downward vertical position. This position is termed "filling position."

Figure 17:
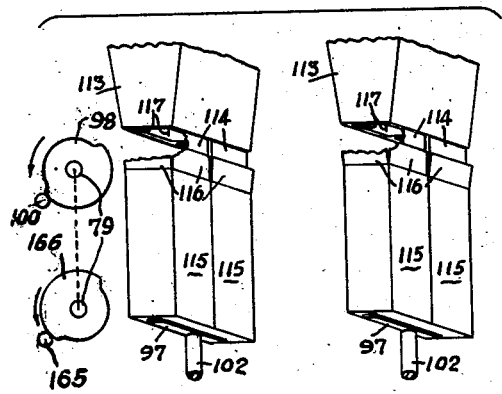
Figures 17 and 18 show still further positions of the cams and, therefore, different positions of the cartons and fingers. It will be noted that Figures 15 to 18 inclusive, in effect, show a complete cycle of operation of the carton-elevating and finger-moving mechanism.
Figure 18:
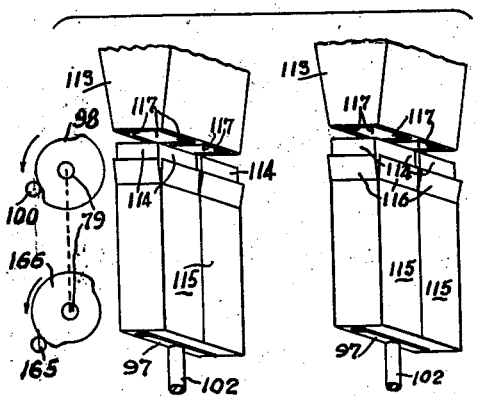

Figure 17 shows the cartons as still remaining in their elevated position, but the fingers have been withdrawn. This condition applies immediately after the carton has been filled, but before the latter has been lowered. Figure 18 shows the cartons as being in their lowered position and the fingers in their upper, horizontal position. Further reference to the sequence of operation and particularly as it relates to the operation of the other cams, all of which must be in proper time relationship will be made when discussing the graph Figure 22.

Intake and discharge feelers

It is desirable that the machine be provided with a means for detecting the absence of empty cartons on the incoming belt, for otherwise, unless cartons are being fed to the hopper, the latter would dump its successive charges on to the machine and the cereal would be wasted. In accordance with the present invention, there is provided an improved form of "feeling" mechanism which detects abnormal condition of not only the complete absence of cartons on the incoming belt, but also the fact that one carton does not immediately succeed another carton in tandem. It will be understood that the cross slide pusher, stop hook and elevating mechanism are all designed to take care of at least two cartons as a unit. Consequently, if less than two cartons were presented to this mechanism, considerable difficulties of operation might be encountered as well as inefficiency.

In addition to the intake feelers, there are provided feelers or detectors on the outgoing belts for the purpose of determining as to whether there is a jam of filled cartons at this point. These discharge feelers are so positioned that, if normal conditions obtain, i. e., if the cartons are proceeding orderly along the belt and are not piling up, the feelers will detect the space between the tandem cartons, which is normally present. If a jam exists at this point, the cartons will contact with one another, and the normal space between cartons will be absent.

It is, therefore, apparent that, whereas the intake feelers detect the abnormal condition of having no cartons at all or the absence of a second carton succeeding the first carton or vice versa, the discharge feelers detect the abnormal condition of having so many cartons appear on the outgoing belt that they actually contact one another.

Each incoming line is provided with a triangular form of intake feeler 169 which is provided at two of its apices with feeling contacts 170, 171 and is pivoted at its other apex on a rod 172. These contacts are spaced apart approximately the distance between the middle lines of two successive cartons in order to feel for either one or both of said cartons. This rod extends into a bore drilled in the end of a lever 173 which is pivoted at 174 to a frame support 175. There is a spring 176 connected between the pivoted point on the feeler 169 (Figure 3) and the nearer end of the lever 173. The pivots 174 are connected through a pair of upright rods 177 (Figure 1) with the pair of horizontal rods 178. One of the rods 178 is connected through a so-called "lever shaft" which is illustrated in Figure 21, to a tripping mechanism shown in Figures 19 and 20, which serves to de-clutch the shaft 47 (Figure 4) and, therefore, all of the cams carried on or associated with the shaft. The other rod 178 is not connected to the lever shaft, but instead operates the tripping mechanism direct. The reason for this dissimilarity of structure will appear, as the remaining protective mechanism is described.

The discharge feelers take the form of hook members 179 (Figure 3), having their curved ends presented to the inner sides of the outgoing belts 30. The members 179 are screwed into levers 180 pivoted at 181 to brackets 182 carried by the frame. The pivots 181 are connected through the upright rods 183 (Figure 1), which are mechanically secured at the bottom to a pair of horizontal rods 184 which connect to the lever shaft shown in Figure 21.

This lever shaft is constituted of a solid shaft and a number of hollow shafts and sleeves surrounding the solid shaft together with a number of cranks and levers which are secured through the various shafts and sleeves in such a way that the operation of the cranks serves to move the respective levers which, in turn, operate the tripping or declutching mechanism. The position of the lever shaft with respect to the other elements of the machine is indicated by the reference character 185 in Figure 4. The shaft is journaled in any suitable manner to the frame. It will be noted that the shaft is positioned near the cam shaft 19 in order that the cams on the latter will operate the cranks on the shaft 185.

Referring again to Figure 21, the solid shaft portion of this mechanism is indicated at 186. Keyed to the shaft 186 at one end is a double crank having its arms 187, 188 extending in divergent directions. Keyed to the opposite end of the same shaft, there is a lever 189. The shaft carries a long sleeve 190 provided with "needle" bearings 191 at each end. There is a lever 192 keyed to the lefthand end of the sleeve 190. The sleeve also carries a double armed crank, the arms of which are designated 193 and 194. The sleeve 190 provides a bearing support for a shorter sleeve 195 at one end and for a still shorter sleeve 196 at the other end. The sleeve 195 is provided at each end with a thin wall indicated at 197; and to the wall on the left, there is keyed a crank 198 and a lever 199. The opposite wall portion is keyed to a lever 200. A sleeve 201 is journaled at the "needle" bearings 202 on the sleeve 195. The sleeve 195 also carries a double armed crank, the arms of which are indicated at 203 and 204. This double crank is journaled on the "needle" bearing 205 and simply idles on the sleeve 195. Apertures 206 may be provided at suitable points on the composite shaft to supply oil to the solid shaft portion 186.

It is apparent that the sleeves 201 and 196 serve to strengthen the composite shaft as well as to space the cranks 198 and 203, also the cranks 193 and 187. The strengthening effect afforded by these sleeves may be enhanced by the ribs 207. Inasmuch as the sleeves 201 and 196 remain stationary during the operation of the composite shaft, these sleeves can also serve as bearing supports suitably positioned on the frame of the machine.

In order to explain the operation of the composite shaft with clarity, it is deemed advisable to give the intake and discharge feelers referred to hereinbefore distinct appellations. The intake feeler 169, etc. shown at the upper lefthand corner of Fig. 3 will hereinafter be termed "intake feeler No. 1." The oppositely positioned feeler on the intake side will be termed "intake feeler No. 2." The outgoing feeler shown to the upper right position in Figure 3 will be termed "discharge feeler No. 1" and the oppositely positioned feeler will be termed "discharge feeler No. 2."

Referring now to Figures 4 and 21, the arm 198 carries a roller 208 which is spring pressed (not shown) against the peripheral surface of a cam 209 carried on the shaft 19. As the cam is rotated, the arm 198 is given a rocking movement which is transmitted through the sleeve 195 to the lever 200. The latter is pivotally connected to the connecting rod 184 of the discharge feeler No. 2. Thus, the rocking movement of the arm 198 gives the rod 184 a horizontal reciprocatory movement which is transmitted through the crank 210 to the rod 183 (Figure 1), causing the discharge feeler No. 2 to swing inwardly and then outwardly during predetermined intervals of time.

The arm 203 (Figure 21) carries a roller 211 which is spring pressed (not shown) against the peripheral surface of a cam 212 carried on the shaft 19 (Figure 4). The arm 204 opposite from the arm 203 is pivotally connected to the connecting rod 178 of the intake feeler No. 2. As the arm 203 is rocked to and fro by its cam, the connecting rod 178 is given a horizontal reciprocatory movement which is transmitted through the crank 213 to the rod 177 (Figure 1), causing contacts 170 and 171 of the intake feeler No. 2 to move inwardly and then outwardly during predetermined time periods.

The arm 193 (Figure 21) carries a roller 214 which is spring pressed (not shown) against the peripheral surface of a cam 215 (Figure 4) which is carried on the shaft 19. The opposite arm 194 is pivotally connected to the connecting rod 184 of the discharge feeler No. 1. Thus, as the arm 193 is rocked by the operation of its cam, the connecting rod 184 is given a horizontal reciprocatory movement and this movement is transmitted through the crank 216 to the rod 183 (Figure 1), which causes the discharge feeler No. 1 to move inwardly and outwardly during predetermined periods of time.

The arm 187 (Figure 21) is provided with a roller 217 which is spring pressed (not shown) against the peripheral surface of a cam 218 (Figure 4) carried on the shaft 19. The opposite arm 188 is pivotally connected to the connecting rod 178 of the intake feeler. As the arm 187 is given a rocking motion by its cam, the connecting rod 178 is given a horizontal reciprocatory motion which is transmitted through crank 218' to the rod 183 (Figure 1), causing contacts 170, 171 of the intake feeler No. 1 to move inwardly and outwardly during predetermined time periods.

Due to the manner in which the various solid and hollow shafts or sleeves interconnect the several arms and levers, it is apparent that, as the arm 198 and the lever 200 are rocked in the manner described above, the lever 199 is given a corresponding rocking motion. Similarly, as the arms 193 and 194 are rocked, the lever 192 is given a corresponding rocking motion. Finally, as the arms 187 and 188 are given a rocking motion, the lever 189 is given a corresponding rocking motion. As stated hereinbefore, the levers 189, 192 and 199 form part of a tripping mechanism for declutching certain parts of the machine when abnormal conditions are detected by the various feelers. The mechanical connection between the arms 203, 204 and the tripping mechanism is not shown in Figure 21, because it is not taken through the composite shaft illustrated therein. However, there is such a connection which will be described, as the tripping mechanism is considered.

*Tripping and declutching mechanism*

The tripping and declutching mechanism is illustrated mainly in Figures 19 and 20 with occasional reference to Figure 4. Secured to the frame in any suitable manner, there is a stud shaft 219 on which is pivotally mounted a bell crank lever having arms 220 and 221. The arm 221 carries at its upper righthand end a roller 222 which is urged by the spring 223 against the peripheral surface of a cam 224 which is keyed to the shaft 19. It will be noted that the cam 224 has a portion which extends for approximately 180° of smaller radius than the remaining portion. Consequently, as the cam is rotated counterclockwise, as seen in Figure 20, the lever 221 is caused to rock in a vertical plane about its pivot 219.

The lower righthand end of the lever 221 carries a rod 225 which serves as a pivot for a wide tripping plate 226. The lower end of this plate is urged to the left, as seen in Figure 20, by a leaf spring 227.

Pivoted to the frame at 228, there is a bell crank lever having an upright arm 229 and a horizontal arm 230 which terminates in a knob indicated at 231. The knob is positioned just below the tripping plate 226 and so arranged that, when the tripping plate 226 is in its normal vertical position and is reciprocated vertically as a result of rotation of the cam 224, the plate will strike the knob and move the bell crank lever against the action of the spring 231' about the pivot 228.

In the same vertical plane as arm 229, there is a notched wheel or ratchet 232 keyed to the shaft 19. Abutting this wheel and running idle on the shaft 19, there is a plate 233. The plate has secured thereto a pawl 234 which is pivoted at 235. It will be noted that the pawl is in the same plane as the notched wheel 232 and its actuating portion is adapted to engage the notch in the wheel. This portion is spring pressed, as indicated at 236, against the notched wheel.

As will be noted from Figure 20, the normal position of the lever 199 which is actuated by the rocking motion of the cam which also actuates intake feeler No. 1, extends downwardly and to the left. On the other hand, the levers 192 and 199 which are actuated by the cams which also actuate the discharge feelers No. 1 and No. 2 extend downwardly and to the right. Only one such lever is illustrated in Figure 20, because these two levers are in line. Consequently, the lever 189 is rocked, first, to the right and then to the left on the shaft 186 simultaneously with the rocking motion of the intake feeler No. 1. The levers 192 and 199 are, first, rocked to the left and then to the right about the shaft 186 simultaneously with the rocking motion of the discharge feelers No. 1 and 2. The lower ends of the levers 189, 192 and 199 are connected through three rods 237 to the lower ends of a number of dogs 238, 239 and 240 which are pivoted at 241 to a stud shaft secured to the frame of the machine. The upper ends of the dogs terminate in curved portions 242 and 243 respectively. The dogs 238 and 240 are in line and are connected respectively to the levers 192 and 199. The dog 239 is connected to the lever 189.

As shown in Figure 19, there is a fourth dog 244 which is connected through the rod 178 (Figure 4) to a crank 245 secured to the upright shaft 177 of the intake feeler No. 2. This dog is in line with the dog 239, as seen in Figure 20, and is given a corresponding rocking motion through the cranks 213, 245 and the connecting rods 178 which reach back to the cam 212 (Figure 4).

Assume that the intake feeler No. 1 is periodically moving inwardly and outwardly and is feeling for a pair of cartons which should normally be present on the incoming belt 34, shown at the upper lefthand corner of Figure 3. Now suppose that, for some reason, this belt is empty of cartons so that the feeler moves inwardly a greater distance than the normal amount, this increase in arcuate travel is communicated through the composite shaft 185 (Figures 4, 21) to the lever 189. The latter then swings through an arc greater than normal to move the curved portion 243 of the dog 239 into contact with the lefthand surface of the tripping plate 226 (Figure 20). This increase in the arcuate travel of the feeler and the depending mechanism and levers obtained in the manner set forth is accommodated by a spring 250 which serves to urge the roller 217 against the cam 218 (Figure 26), but the roller does not actually contact with the small diameter of the cam unless the travel of the feeler is increased upon detection of an abnormal condition in the incoming carton feed lines. The normal path taken by the roller is indicated by the dot-dash line 251 in Figure 26. The immediate effect of the curved portion 243 striking the tripping plate 226 is to cause the latter to miss the knob 231 during the downward excursion of the plate 226. The arm 229 of the bell crank lever will, therefore, remain in its normal vertical position. This position is such that, as the plate 233 is rotated carrying the pawl 234, the tail of the pawl will strike the upper edge of the arm 229. This action will disengage the pawl from the notched wheel and cause the latter to slip with respect to the plate 233. This plate is mechanically secured through a coupling 246 to the sprocket 51 which carries the chain 50 (Figures 4 and 19), and all three members idle on the shaft.

Consequently, there is no rotative effort communicated from the shaft 19 to the sprocket 51 under the conditions set forth, and its chain and the shaft 47 (Figure 4) comes to a halt. As explained hereinbefore, the shaft 47 carries all of the cam mechanism for operating the carton cross slide for both lines of carton travel and, in addition, carries a cam for operating the carton pusher mechanism for both lines. Inasmuch as the jack shaft 153 is geared to the cam shaft 47, a stoppage of the last-mentioned shaft will also stop the mechanism for rotating the impellers in the hoppers on both sides of the machine. Consequently, a direct mechanical connection can be traced, as indicated, from an inward movement of the intake feeler No. 1, which is greater than the normal movement, through the composite shaft, through the tripping mechanism, through the declutchable coupling, to the main cam shaft 47 and the jack shaft 153, which operate the cross slides, the pusher and the feeding mechanism.

Let us consider for a moment that the cartons on the belts 34 were not uniformly spaced so as to be felt or detected simultaneously by the contacts 170 and 171 of the intake feeler No. 1. If either of the two cartons comprising a tandem unit were missing, the feeler would still move inwardly greater than the normal amount, not so far as when both cartons are missing, but still far enough when proper adjustments are made to stop the shafts 47 and 153 through the interconnecting mechanism.

The same action, as explained above, takes place with respect to the intake feeler No. 2, except that the mechanical connection does not go through the composite shaft in Figure 21. When this feeler moves inwardly an amount greater than normal, as a result either of complete absence of cartons or the absence of one carton of a tandem pair, this increase in travel is communicated through the cranks 213 and 245 (Figure 4), the connecting rod 178 to the dog 244 (Figure 19) which operates the declutching mechanism in precisely the same manner as its companion dog 239.

Now suppose that a jam has occurred on the upper outgoing belt (Figure 3), so that the feeler 179 is prevented from swinging inwardly to the position which would indicate the normal spacing between cartons at this point. This decreased amount of travel of the feeler is communicated through the composite shaft 185 (Figures 4, 21), through the lever 192 to the dog 238 (Figure 20). This dog is so positioned that, when given a normal swing, the tripping plate 226 is caused to strike the knob 231 during the vertical excursions of the plate 226. However, when the arcuate travel of the dog 238 is less than normal, as would be caused by the discharge feeler No. 1 striking a misplaced carton, the curved portion 242 will not be moved its normal distance away from the tripping plate 226 but will serve to hold the plate away from the knob 231 during the vertical excursions of the plate, causing the plate 226 to miss the knob 231. Thus, the arm 229 again remains in the path of the pawl 234, which causes a disengagement between the notched wheel 232 and the plate 233.

The discharge feeler No. 2 operates in precisely the same manner after detecting the absence of a space between cartons passing along its belt, but in this case the decreased arcuate travel of the feeler is communicated through the composite shaft 185 to its lever 199 which serves to prevent the tripping plate 226 from striking the knob 231. It will be noted that the discharge feelers serve to uncouple the shafts 47, 153 at the clutch 232, 233 when they detect an abnormal condition at their position on the outgoing or discharge belts. As in the case of the intake feelers, the discharge feelers operate to stop the cross slide, the pusher and the feeder mechanism. It should also be noted that, as in the case of the intake feelers, either of the discharge feelers can bring about this stoppage.

*The cycle of operation (cam design)*

Figure 22 shows, in graph form, the relation between the periodic movements of the various mechanisms. This figure employs an ordinate designating the travel of the various cams, and an abscissa designating angles of rotation marked off in degrees. While the graphs appear to be self-explanatory for the most part, a few illustrative examples will be pointed out. Take, for example, the first two curves which are designated "Cross slide cam" and "Package pusher cam"; it will be noted that the cam mechanism moves the cross slide plate 60 for sixty degrees and then rests at its innermost position for 110 degrees, returning during 60 degrees and then resting at its outermost position for 130 degrees. On the other hand, the package pusher cam pushes the package or carton for 160 degrees, then rests for only ten degrees at its extreme righthand position, returning during 160 degrees and resting at its lefthand position for thirty degrees.

A comparison between the curves labeled "Sack opener cam" and "Package lift cam" is interesting. It will be noted that the fingers 117 are held in their horizontal position for 170 degrees and start to move downwardly shortly after the carton has started to be elevated. Moreover, the carton remains in its elevated position until the fingers have been withdrawn upwardly to their horizontal position.

The feeler cam curves show that the intake and discharge feelers operate practically in unison. The intake set of feelers detect for the absence of cartons, which would indicate an abnormal condition and the discharge feelers detect for the presence of cartons, which would also indicate an abnormal condition.

The fourth curve indicates the periodic movement of the hooks 88 which serve to stop the cartons when they reach a position under the filling hopper. A comparison of this curve with the "Package lift cam" curve shows that the packages or cartons are completely stopped by the hooks 88 almost simultaneously with the time at which the elevation of the cartons is started. However, the hooks remain in their innermost position, notwithstanding the fact that the cartons have been lifted away from the hooks for almost 195 degrees.

A comparison between the curves designated "Feeder crank" and "Package lift cam" will show that the impeller blades of the feeder start to operate at the same instant that the cartons have reached their elevated position. Many other interesting time relations between the operations of the various mechanism can be obtained from graphs shown in Figure 22, and it will be understood that the cams are so designed and positioned on their respective shafts to provide the optimum operating conditions which, in a general way, are illustrated by the graphs.

*Automatic "no food" shut off*

The automatic control mechanism which has been described up to this point is concerned more especially with abnormal carton conditions existing on the conveyors. However, in accordance with another feature of the invention, there is provided an arrangement by which the cam shaft 47 is stopped by a declutching operation when the inlet pipe which feeds the quadrantal hopper is empty of cereal. Unless such protection is afforded, it is apparent that cartons may be constantly presented to the empty hopper and would be conveyed by the outgoing belts to the next machine which would proceed to seal the empty cartons.

Referring more particularly to Figures 23 and 24, there is provided in the inlet 247 an opening which receives a drum 248 closed at one end by the plate 249, and carrying at the opposite end a flexible diaphragm 250. The arrangement is such that the diaphragm extends an appreciable distance into the inlet. Secured to the plate 249 and extending outwardly therefrom, there is a bar 251 about which a second bar 252 is pivoted at 253. The center portion of the diaphragm 250 carries a rod 254 which is pivoted at 255 on the bar 252. The bar 252, at its end opposite from the pivot, carries a mercury switch 256 of any suitable and well-known type.

Electrical connections 257 are taken through a source of current supply (not shown) to an electric magnet 258. The armature of the electromagnet is pivoted to a bar 259 which is fulcrumed at 260. There is an upwardly extending bar 261 supported at 262 on a pivot 263 and biased to the left by a spring 264. The bar 261 extends above its pivot to such a height as to abut the end of the bar 259, when the latter is in its lower position, as indicated by the full lines, but is adapted to move under the bar 259 when the latter is in its upper position, as indicated by the dotted lines.

Cooperating with the mechanism described up to this point, is the shaft 47 and associated apparatus which includes the cams 50a. It will be recalled that these cams operate the carton cross slide, pusher and the feeder mechanism. Figure 25 is a duplicate of the lefthand portion of Figure 4 and includes all of the apparatus shown thereon, except for the following particulars, a clutch 265 and a cam 266 are additionally employed and the shaft 47 is broken within the clutch in order to provide for a declutching operation.

As shown in Figure 25, the cam 266 is mounted adjacent the driven sprocket 49 and is provided on its inner plane surface with an extended notch indicated at 267. This notch receives the roller 268 which is mounted at the end of the shaft 269. The latter is supported in a bracket 270. Clutch 265 is constituted of a notched wheel 271 which is keyed to the lower portion of the shaft 47. Adjacent the wheel 271, there is plate 272 which runs idling on the lower portion of the shaft 47, but is keyed or otherwise rigidly secured to the upper or remaining portion of the shaft 47. The plate 272 carries a pawl 273 pivoted at 274, the pawl being normally spring pressed into the notch of the wheel 271. The bar 261 extends downwardly to such a position that, when it abuts the horizontal bar 259, the lower end of the bar 261 is directly in the path of the pawl 273. However, as the bar 261 rotates on its pivot 263 and assumes a position indicated by the dotted lines, the lower end of the bar is removed from the path of the pawl.

Now, assume that the lower portion of the shaft 47 is being rotated by the chain and sprocket arrangement 49, 50. The rotating notch in the plate 266 causes the rod 269 to reciprocate in its bearing 270 and periodically to press against the lower end of the bar 261. If the electromagnet 258 were de-energized, this would cause the bar 259 to assume its dotted position. The bar 261 would then be free to rotate or rock on its axis 263, since it can slide under the righthand end of the bar 259. This rocking effect is produced by the action of the spring 264 and the horizontal movements of the rod 269. The position of the notch 267 is predetermined such that, as the lower end of the bar 261 is periodically moved inwardly toward the notched wheel, this movement does not coincide with the position of the pawl 273 if the latter is being continually rotated. Consequently, notwithstanding the rotary excursions of the bar 261, the pawl continues to engage its ratchet and the upper portion of the shaft 47 receives a rotative effort from the lower shaft.

However, when a scarcity of food exists in the intake 247, the diaphragm 250 flexes inwardly, carrying the arms 254, 252, and closes the circuit at the mercury switch 256. This causes the electromagnet 258 to become energized, which pulls up its armature and swings the righthand end of the bar 259 downwardly. This bar snaps the upper end of the bar 261 into the position indicated by the full lines, causing the lower end of the bar 261 continually to remain in the path of the pawl 273. Thus, the coupling 265 is declutched and the upper shaft 47 comes to a stop. The cross slide, pusher and feeding mechanism are, therefore, stopped when the intake 247 is empty and the hoppers can no longer feed the cartons with cereal.

Mannual stoppage of the hopper

In case of an emergency, it is sometimes desirable manually to stop one or both sides of the dual hopper. The mechanism for accomplishing this is shown in Figures 5 and 6. The lefthand end-bearing member 123 may carry, in addition to the arm 135 and its associated apparatus, an arm 275 which is free on the hub and in any suitable manner is given a fixed upwardly extending diagonal position, as seen in Figure 5. The upper end of the arm 275 carries a pivot for the dog 149 referred to hereinbefore. One end of the dog is so shaped and positioned as to engage the roller 143 during the excursions of the pawl 141 (both of which were referred to hereinbefore) when that end of the dog is moved downwardly on its pivot. The other end of the dog is pivotally secured to a connecting rod 276 which is actuated through a bell crank 277 and a rod 278 by a hand-operated lever 279. The latter is secured to the frame of the machine in a position convenient to the operator.

When it is desired to stop either one or both of the feeding mechanisms, the lever or levers 279 are moved, which causes one or both dogs 149 to engage the upper end of either or both ratchets 141. The latter are then thrown out of engagement with the teeth on the wheel 136 and the impellers within each hopper come to rest.

From the foregoing, it is evident that there has been described a high speed filler employing two lines of cartons and arranged to fill one, two or more pairs of cartons abreast, as delivered by the conveyors. It is also apparent that the cross slide, pusher and feeding mechanism can be so designed as to accommodate any number of pairs of cartons which reach the filling position abreast. The protective devices, either automatical or manual control, can also be modified to accommodate different numbers of pairs of cartons. The advantages of the double line conveying and filling arrangement over the single line, and particularly when both lines contain at least two spouts, i. e., a quadruple hopper, are many. But the main advantage comes in reducing the stroke of the conveying and elevating mechanism, and hence the time required to place cartons into filling position, again reducing the stroke of the mechanism which removes the cartons from the filling machine, and thus again decreasing the time consumed by this operation. This is in contrast to the conventional practice of moving a single line of cartons, in which case, if four cartons were placed under four filling spouts in line, the time and stroke required to move the four cartons away from the filling machine would be double that required in the case of the present machine.

It is further apparent that, by simultaneously presenting two or more cartons in abreast, in tandem and in abutting relation to the discharge openings of the rotatable hopper, the "non-filling" portion of the operating cycle is considerably reduced as compared with the cycle in which the cartons are presented simply in a single line and spaced from one another. Consequently, the improved machine operates very efficiently and its filling speed is so high that the machine may be gaited to the high speed processing units which feed the filling machine with material for packaging.

This carton abreast and tandem relation also offers the further advantage in that it permits the grouping of the compartments 109 (Figure 23) containing the rotatable hoppers, across the full area of the cross section of the inlet pipe or supply hopper 247. It will be understood that the conduit which leads into the inlet pipe 247 must be of a size not less than a minimum which might cause the fluid material to clog. The inlet to the supply hopper 247 is normally quite large, as indicated in Figure 23. The sides of the supply hopper 247 preferably should diverge as the rotatable hopper is approached. By arranging the compartments 109 in abreast and tandem relation and drawing their supply of material from the common supply hopper 247, it is apparent that the inlet openings in the compartments 109 can extend across the full area of the opening in the supply hopper 247. This can be readily seen in Figures 8, 9 and 10. The fact that all of these openings are of considerably greater size than the opening in the inlet to the supply hopper 247, permits the latter to have diverging sides and thus eliminates all "bridging" of material which might normally be present, if a converging or "funnel" effect were introduced in any of the passageways. Since clogging of the material is eliminated, there is no need for hopper agitators with their consequent breakage effect.

It will be understood that we desire to comprehend within our invention such modifications as come within the scope of the claims and the invention.

Having thus fully described my invention, what I claim as new and desire to secure by Letters Patent is:

1. A machine for filling cartons with fluent material comprising a compartment containing said material, discharge openings in said compartment, conveyor means adapted to carry empty cartons toward said compartment, means for supplying said conveyor means with the cartons, said supplying means comprising mechanism for pushing the cartons as a group transversely of the machine and into line with the conveyor means, said supplying means also including mechanism for pushing said group of cartons on to the conveyor means, means for moving each group of cartons from said conveyor means into filling position with respect to said discharge opening, said last-mentioned means also serving to return each carton group to the conveyor means after the cartons of the group have been filled with said material.

2. A machine for filling cartons with fluent material comprising a compartment containing said material, said compartment being provided with a plurality of discharge openings in line and abreast, a conveyor in each of a plurality of parallel feed lines adapted to carry empty cartons toward said compartment, means in each line for pushing a plurality of said cartons as a group transversely of each line into position in line with its respective conveyor, separate means for pushing said group of cartons on to each conveyor, means for presenting each carton group to one group of discharge openings in line to be filled whereby cartons are presented to all of the discharge openings in said compartment, said last-mentioned means also serving to move each filled carton group away from said openings.

3. A machine for filling cartons with fluent material comprising a compartment containing said material, said compartment being provided with a plurality of discharge openings in line and abreast, a conveyor in each of a plurality of parallel feed lines adapted to carry empty cartons toward said compartment, means in each line for pushing a plurality of said cartons as a group transversely of each line into position in line with its respective conveyor, separate means for pushing said group of cartons on to each conveyor, means for presenting each carton group to one group of discharge openings in line to be filled whereby cartons are presented to all of the discharge openings in said compartment, said last-mentioned means also serving to move each filled carton group away from said openings, said means for pushing each carton group transversely of the line of carton feed operating prior to the means for pushing the carton group on to the conveyor.

4. A machine for filling cartons with fluent material comprising a compartment containing said material, said compartment being provided with a plurality of discharge openings in line and abreast, a conveyor in each of a plurality of parallel feed lines adapted to carry empty cartons toward said compartment, means in each line for pushing a plurality of said cartons as a group transversely of each line into position in line with its respective conveyor, separate means for pushing said group of cartons on to each conveyor, means for presenting each carton group to one group of discharge openings in line to be filled whereby cartons are presented to all of the discharge openings in said compartment, said last mentioned means also serving to move each filled carton group away from said openings, said means for pushing each carton group transversely of the line of carton feed operating simultaneously with the corresponding means of the other line and prior to the means for pushing the carton group on to the conveyor which also operates simultaneously with the corresponding means of the other line.

5. A machine for filling cartons with fluent material comprising a compartment containing said material, said compartment being provided with discharge openings, means for conveying a plurality of empty cartons in line and as a group toward said compartment, means for presenting said cartons to said discharge openings for filling, means in said conveying line for detecting the absence of any one carton of the group, and means responsive to said detecting means for stopping the machine when any one carton of the group is missing.

6. A machine for filling cartons with fluent material comprising a compartment containing said material, said compartment being provided with discharge openings, means for conveying groups of two cartons each toward said compartment, means for presenting each carton pair to said discharge openings for filling, means in the conveying line for determining simultaneously as to whether both of the cartons of each pair are being conveyed toward said compartment, and means responsive to said determining means for stopping the machine in case either one of the carton pair is missing from the conveying line.

7. A machine for filling the cartons with fluent material comprising a compartment containing said material, said compartment being provided with discharge openings, means for conveying groups of two cartons each toward said compartment, means for presenting each carton pair to said discharge openings for filling, means in the conveying line for determining simultaneously as to whether both of the cartons of each pair are being conveyed toward said compartment, and means responsive to said determining means for stopping the machine in case either one of the carton pair is missing from the conveying line, said determining means comprising a member having two contacts spaced apart a distance corresponding to the distance between cartons, each of said contacts being adapted to feel for a carton of each carton pair.

8. A machine for filling cartons with fluent material comprising a hopper containing said material, said compartment being provided with discharge openings in line and abreast, means for conveying a plurality of parallel lines of cartons toward said compartment, means for presenting a plurality of cartons as a group in each line to said discharge openings for filling, means in each line for determining simultaneously whether all of the cartons in each group are being conveyed toward said compartment, said determining means in each of said lines operating simultaneously with the corresponding means of another of said lines, and means responsive to any one of said determining means for stopping the machine in case any one of any group of cartons is missing from any one of the conveyor lines.

9. A machine for filling cartons with fluent material comprising a compartment containing said material, said compartment being provided with a plurality of discharge openings, means for conveying the cartons toward said compartment and for presenting them to said openings for filling, means for feeding a plurality of empty cartons as a group to said conveyor means, means positioned in said feeder line for determining whether all of the cartons in each group are being fed to said conveyor means, and means responsive to said determining means for stopping the carton-feeding means in case any one of the group of cartons being fed to the conveyor means is missing from the carton-feeding means.

10. A machine for filling cartons with fluent material comprising a compartment containing said material, said compartment being provided with a plurality of discharge openings, means for feeding said material to said compartment, means for conveying empty cartons toward said compartment, means for presenting said cartons to said discharge openings for filling, means for supplying a plurality of empty cartons as a group to said conveyor means, means in said carton-supplying line for determining whether all of the cartons of each group are present in the carton-supplying line, and a mechanical connection means responsive to said determining means for stopping the means which feeds fluent material to said compartment and also stops the carton-supplying means when any one of the group of cartons is missing from the carton-supplying line.

11. A machine for filling cartons with fluent material comprising a compartment containing said material, said compartment being provided with a plurality of discharge openings, means for feeding said material to said compartment, means for conveying empty cartons toward said compartment, means for presenting said cartons to said discharge openings for filling, means for supplying a plurality of empty cartons as a group to said conveyor means, means in said carton-supplying line for determining whether all of the cartons of each group are present in the carton-supplying line, and a mechanical connection means responsive to said determining means for stopping the means which feeds fluent material to said compartment and also stops the carton-supplying means when any one of the group of cartons is missing from the carton-supplying line, said mechanical connections comprising actuating cams driven by a common clutch which is de-clutched when the determining means detects an abnormal condition in the carton supply line.

12. A machine for filling cartons with fluent material comprising a compartment containing said material, said compartment being provided with a plurality of discharge openings in abreast formation, means for presenting cartons in a plurality of lines to said openings for filling, means for removing said cartons away from said openings over a plurality of outgoing lines after being filled, means in each of said outgoing lines for detecting an abnormal condition space between cartons in any one of said outgoing lines, and means for stopping the machine when the determination by said detecting means shows an abnormal carton position in any one of said outgoing lines.

13. A machine for filling cartons with fluent material comprising a compartment containing said material, said compartment being provided with a pair of discharge openings in line and in abreast formation, means for presenting pairs of cartons in two lines to said discharge openings, means for removing said carton pairs away from said openings after being filled over a pair of outgoing lines, means in each line for detecting a "piling up" carton condition in its respective line, and means for stopping the machine when the detecting means shows an abnormal carton condition in either of said outgoing lines.

14. A machine for filling cartons with fluent material comprising a compartment containing said material, said compartment being provided with a pair of discharge openings in line and in abreast formation, means for presenting pairs of cartons in two lines to said discharge openings, means for removing said carton pairs away from said openings after being filled over a pair of outgoing lines, means comprising a pair of simultaneously operating detectors in said pair of lines for detecting a "piling up" carton condition in their respective lines, and means for stopping the machine when said detectors show an abnormal carton condition in either of said outgoing lines.

15. A machine for filling cartons with fluent material comprising a compartment containing said material, said compartment being provided with a plurality of discharge openings, means for feeding fluent material to said compartment, conveyor means for moving empty cartons toward said openings, means for supplying cartons as a group to said conveyor means, means for moving cartons as an outgoing line from said discharge openings after being filled, means in said outgoing line for detecting an abnormal condition of spacing between cartons in the outgoing line, and means including mechanical connections for stopping the compartment feeding means and the carton-supplying means when said detection means shows an abnormal carton position in the outgoing line.

16. A machine for filling cartons with fluent material comprising a compartment containing said material, said compartment being provided with a plurality of discharge openings, means for feeding fluent material to said compartment, conveyor means for moving empty cartons toward said openings, means for supplying cartons as a group to said conveyor means, means for moving cartons as an outgoing line from said discharge openings after being filled, means in said outgoing line for detecting an abnormal condition of spacing between cartons in the outgoing line, and means including mechanical connections for stopping the compartment feeding means and the carton-supplying means when said detection means shows an abnormal carton position in the outgoing line, said mechanical connections being operable by cams positioned on a common shaft and driven by a clutch which is de-clutched when the detecting means determines an abnormal condition in the outgoing line.

17. A machine for filling cartons with fluent material comprising a compartment containing said material, said compartment having discharge openings in line and abreast, means for conveying a plurality of lines of cartons toward said compartment, means for presenting a plurality of cartons as a group in each line to said discharge openings for filling, means in each line for detecting whether all of the cartons in each group are being conveyed, means for removing said cartons away from said openings after filling to form a plurality of outgoing lines, means in each of said outgoing lines for detecting an abnormal condition of spacing between cartons, and a common means responsive to the operation of any of the detecting means in the conveying and outgoing lines for stopping the machine when an abnormal carton condition arises in any one of said lines.

18. A machine for filling cartons with fluent material comprising a compartment, said compartment having a pair of discharge openings in line and abreast, means for conveying a pair of lines of cartons toward said compartment, means for presenting a pair of cartons as a group in each line to said discharge openings for filling, means in each line for detecting whether either one of the pair of cartons in each group is missing from its line, means for removing cartons away from said openings after filling to form a pair of outgoing lines, means in each of said outgoing lines for detecting a "piling up" carton condition in that line, and a common means responsive to any one of said detecting means in the conveying and outgoing lines for stopping the machine when an abnormal carton condition arises in either of said pairs of lines.

19. A machine for filling cartons with fluent material comprising a compartment containing said material, said compartment having a plurality of discharge openings in line and abreast, means for feeding fluid material to said compartment, means for conveying a plurality of lines of cartons toward said compartment, and means for presenting a plurality of cartons as a group in each line to said discharge openings for filling, means for supplying a plurality of empty cartons as a group to said conveying means in each line, means forming part of each carton-supplying means for detecting whether all of the cartons in each group of each supplying means are being supplied to the conveying means, means for removing said cartons away from said discharge openings after filling to form a plurality of outgoing lines, means in each of said outgoing lines for detecting an abnormal condition of spacing between filled cartons, and means including mechanical connections responsive to any of the detecting means in the carton supply means and the outgoing lines for stopping the said compartment-feeding means and the carton-supplying means when an abnormal carton condition arises in any one of the said lines.

20. A machine for filling cartons with fluent material comprising a compartment containing said material, said compartment having a plurality of discharge openings in line and abreast, means for feeding fluid material to said compartment, means for conveying a plurality of lines of cartons toward said compartment, means for presenting a plurality of cartons as a group in each line to said discharge openings for filling, means for supplying a plurality of empty cartons as a group to said conveying means in each line, means forming part of each carton-supplying means for detecting whether all of the cartons in each group of each supplying means are being supplied to the conveying means, means for removing said cartons away from said discharge openings after filling to form a plurality of outgoing lines, means in each of said outgoing lines for detecting an abnormal condition of spacing between filled cartons, and means including mechanical connections responsive to any of the detecting means in the carton supply means and the outgoing lines for stopping the said compartment-feeding means and the carton-supplying means when an abnormal carton condition arises in any one of the said lines, said mechanical connections being actuated by a common cam shaft and driven by a clutch which is de-clutched when any of said detecting means shows that there is an abnormal carton condition in any one of said lines.

21. A machine for filling cartons with fluent material comprising a compartment containing said material, said compartment being provided with a plurality of discharge openings in abreast formation, means for presenting empty cartons to said openings in a plurality of lines whereby the cartons are filled from said compartment, and means for stopping the feed to both of said openings when abnormal conditions arise in either of said carton-presenting lines.

22. A machine for filling cartons with fluent material comprising a compartment containing said material, said compartment being provided with a plurality of discharge openings in abreast formation, means for presenting empty cartons to said openings in a plurality of lines, a multi-sectioned hopper in said compartment adapted to provide successive charges of material to each of said openings, means for indexing said hopper so as successively to bring each section thereof adjacent said openings, and means for stopping the index movement when abnormal conditions arise in any of said lines.

23. A machine for filling cartons with fluent material comprising a compartment containing said material, said compartment being provided with a plurality of discharge openings in abreast formation, means for presenting empty cartons to said openings in a plurality of lines, a multi-sectioned hopper in said compartment adapted to provide successive charges of material to each of said openings, means for indexing said hopper so as successively to bring each section thereof adjacent said openings, and means for stopping only the index movement when abnormal conditions arise within the machine, said stopping means comprising a hand-operated lever.

24. A machine for filling containers with fluent material comprising a compartment containing said material and having at least a pair of discharge openings in abreast formation, means for presenting containers in two parallel feed lines to said openings, a plurality of fingers secured to each compartment adjacent said openings and adapted to move into position such as to spread the mouth of the containers when the latter are being presented to said openings, whereby the material is fed into open mouths of the containers, said fingers having an arcuate configuration, and means for moving the fingers of all of the feed lines simultaneously and in a direction such that the outer curved portion of the fingers contacts with the interior surfaces of the containers.

25. A machine for filling cartons with fluent material comprising a compartment containing said material and provided with at least two discharge openings abreast, means for presenting empty cartons to said openings in at least two parallel lines whereby both lines of cartons are simultaneously filled from said compartment, means in said compartment for presenting successive charges of material to said openings, and means responsive to a scarcity of material in said compartment for stopping the flow of material to said discharge openings when the material is less than a predetermined amount.

26. A machine for filling cartons with a fluent material comprising a compartment containing said material and provided with a discharge opening, conveyor means for presenting empty cartons to said opening, said means including a means for pushing the cartons first in a transverse direction in line with the conveyor means and then longitudinally on to the conveyor means, means in said compartment for feeding material to said opening, and means responsive to a scarcity of material in said compartment for stopping the pusher and feeding means, said responsive means being so arranged and constructed as to permit all of said conveyor means to operate except the pusher mechanism when a scarcity of material in said compartment is detected.

27. A machine for filling cartons with fluent material comprising a compartment containing said material, said compartment having a plurality of discharge openings in abreast formation, conveyor means for presenting empty cartons to said openings in at least two parallel lines, means in each of said lines for pushing the cartons first in a transverse direction into line with the conveyor means and then longitudinally on to the conveyor means, means in said compartment for feeding successive charges of material to said openings whereby each line of cartons is filled simultaneously, and means responsive to a scarcity of material in said compartment for stopping only the pusher and feeding means in both lines.

28. In combination, a device for filling cartons with fluent material, said device comprising a supply compartment which leads into a distributing compartment containing a plurality of rotatable supply hoppers, said hoppers being arranged in line and abreast, said distributing compartment and contained hoppers extending over an area at least as large as said supply compartment, and means for presenting cartons in line and abreast to a filling position beneath said hoppers.

29. In combination, a device for filling cartons with fluent material, said device comprising a supply compartment containing fluid material and leading through a passageway into a distributing compartment, said distributing compartment being of larger size than said supply compartment, whereby said passageway has areas which increase as the distributing compartment is approached, said distributing compartment containing a plurality of rotatable supply hoppers, discharge openings in said distributing compartment communicating with said hoppers and extending over substantially the entire area of said distributing compartment, and means for presenting a plurality of cartons in line and abreast to said discharge openings.

RICHARD S. POOLE.
DONALD E. MARSHALL.